US010697858B2

(12) United States Patent
Held et al.

(10) Patent No.: US 10,697,858 B2
(45) Date of Patent: *Jun. 30, 2020

(54) METHOD AND DEVICE FOR CHECKING TYRES

(71) Applicant: Pirelli Tyre S.p.A., Milan (IT)

(72) Inventors: Alessandro Held, Milan (IT); Vincenzo Boffa, Milan (IT); Daniele Pecoraro, Milan (IT); Valeriano Ballardini, Imola (IT); Josef Engelsberger, Neubeuern (DE); Bernd Leitner, Neubeuern (DE)

(73) Assignee: PIRELLI TYRE S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/060,707

(22) PCT Filed: Dec. 16, 2016

(86) PCT No.: PCT/IB2016/057711
§ 371 (c)(1),
(2) Date: Jun. 8, 2018

(87) PCT Pub. No.: WO2017/103872
PCT Pub. Date: Jun. 22, 2017

(65) Prior Publication Data
US 2018/0364134 A1 Dec. 20, 2018

(30) Foreign Application Priority Data
Dec. 16, 2015 (IT) .............................. UB2015A9593

(51) Int. Cl.
G01M 17/02 (2006.01)
G06T 7/00 (2017.01)
(Continued)

(52) U.S. Cl.
CPC .......... *G01M 17/027* (2013.01); *G06T 7/001* (2013.01); *H04N 5/04* (2013.01); *H04N 5/2256* (2013.01);
(Continued)

(58) Field of Classification Search
None
See application file for complete search history.

(56) References Cited

U.S. PATENT DOCUMENTS 5,987,978 A * 11/1999 Whitehead ............. G01B 11/22
73/146
6,327,374 B1 12/2001 Piironen et al.
(Continued)

FOREIGN PATENT DOCUMENTS

CN 1624420 A 6/2005
CN 1849496 A 10/2006
(Continued)

OTHER PUBLICATIONS

International Search Report form the European Patent Office in corresponding International Application No. PCT/IB2016/057711 dated Mar. 20, 2017.
(Continued)

Primary Examiner — Reza Aghevli
(74) Attorney, Agent, or Firm — Finnegan, Henderson, Farabow, Garrett & Dunner, L.L.P.

(57) ABSTRACT

The present invention relates to a device (10) for checking a tyre (200), the device (10) comprising: a detection system (104) comprising a camera (105) having an optical plane (107) passing through the camera (105) and defining a focal plane (121); a first light source (110), a second light source (108) and a third light source (109) adapted for emitting a first light radiation, a second light radiation and a third light
(Continued)

radiation, respectively to illuminate a surface portion of said tyre at or close to said focal plane (121), said second light source (108) and said third light source (109) being arranged at opposite sides with respect to said optical plane (107); where said first light source (110) is fixed with respect to said detection system (104) and said second light source (108) and third light source (109) are adapted to be movable from a first inactive configuration where they are controlled to not emit said second light radiation and third light radiation and wherein the distance (d2, d3) of said second light source (108) and of said third light source (109) from said focal plane (121) is greater than the distance (d1) of said first light source (110) from said focal plane (121) to an active configuration wherein they are adapted for emitting at least one among said second light radiation and said third light radiation and wherein the distance (d2, d3) of said second source (108) and of said third source (109) from said focal plane (121) is equal to or less than the distance (d1) of said first source (110) from said focal plane (121); and a drive and control unit (140) adapted for activating said detection system (104) to acquire a first image and at least a second image of a first surface portion and a second surface portion of said tyre (200) in said inactive configuration and in said active configuration, respectively.

23 Claims, 10 Drawing Sheets

(51) Int. Cl.
H04N 5/04 (2006.01)
H04N 5/225 (2006.01)
(52) U.S. Cl.
CPC ............ G06T 2207/10024 (2013.01); G06T 2207/10152 (2013.01)

(56) References Cited

U.S. PATENT DOCUMENTS

| | | | | |
|---|---|---|---|---|
| 7,568,385 B2* | 8/2009 | Maehner | ............ | G01B 11/161 73/146 |
| 8,059,279 B2* | 11/2011 | Iino | ............ | G01N 21/9515 356/237.1 |
| 2001/0052259 A1 | 12/2001 | Mahner | | |
| 2008/0202229 A1* | 8/2008 | Maehner | ............ | G01B 11/161 73/146 |
| 2010/0002244 A1* | 1/2010 | Iino | ............ | G01M 17/027 356/601 |
| 2011/0018999 A1 | 1/2011 | Joly et al. | | |
| 2011/0188731 A1 | 8/2011 | Sekiguchi | | |
| 2012/0008148 A1* | 1/2012 | Pryce | ............ | G01B 11/245 356/601 |
| 2016/0258842 A1* | 9/2016 | Taylor | ............ | G01B 11/22 |
| 2016/0377556 A1 | 12/2016 | Boffa et al. | | |
| 2017/0350793 A1* | 12/2017 | Boffa | ............ | G01N 21/8851 |
| 2017/0370807 A1* | 12/2017 | Boffa | ............ | G01M 17/021 |
| 2018/0266810 A1* | 9/2018 | Boffa | ............ | G01N 21/954 |
| 2018/0299353 A1* | 10/2018 | Held | ............ | G01M 17/027 |
| 2018/0328819 A1* | 11/2018 | Boffa | ............ | G01M 17/027 |
| 2018/0364134 A1* | 12/2018 | Held | ............ | G01M 17/027 |
| 2018/0372590 A1* | 12/2018 | Held | ............ | G01M 17/027 |
| 2018/0372592 A1* | 12/2018 | Held | ............ | G01M 17/02 |
| 2019/0017902 A1* | 1/2019 | Held | ............ | G01N 21/8806 |
| 2019/0086293 A1* | 3/2019 | Held | ............ | G01N 21/8806 |
| 2019/0145862 A1* | 5/2019 | Boffa | ............ | G01B 11/245 348/92 |

FOREIGN PATENT DOCUMENTS

| | | |
|---|---|---|
| CN | 101672627 A | 3/2010 |
| CN | 103038601 A | 4/2013 |
| CN | 104251866 A | 12/2014 |
| DE | 10 2007 009040 B3 | 5/2008 |
| EP | 0785421 A2 | 7/1997 |
| EP | 2 078 955 A1 | 7/2009 |
| EP | 2 322 899 A1 | 5/2011 |
| JP | H 9277806 | 10/1997 |
| WO | WO 2015/004587 A1 | 1/2015 |

OTHER PUBLICATIONS

Written Opinion of the International Searching Authority from the European Patent Office in corresponding International Application No. PCT/IB2016/057711 dated Mar. 20, 2017.
Notification of the First Office Action dated Nov. 18, 2019, from China National Intellectual Property Administration, in counterpart Chinese Application No. 201680073691.5.

* cited by examiner

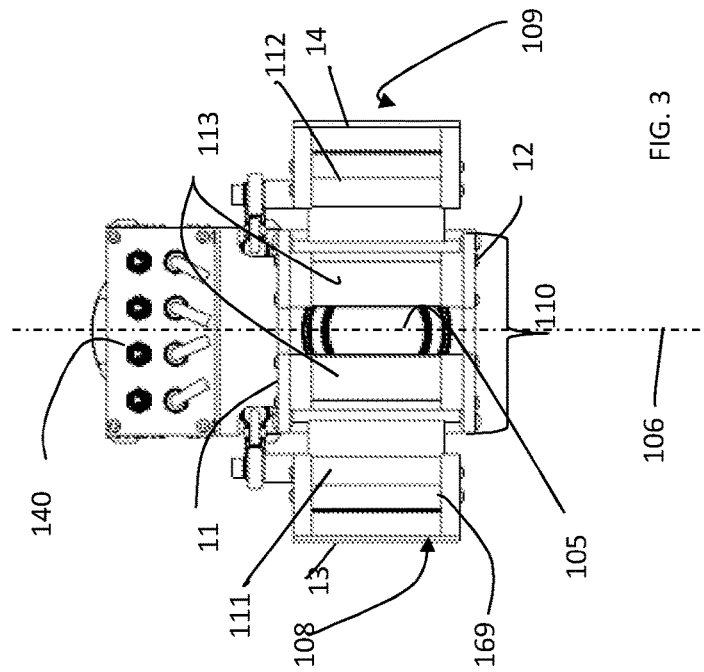
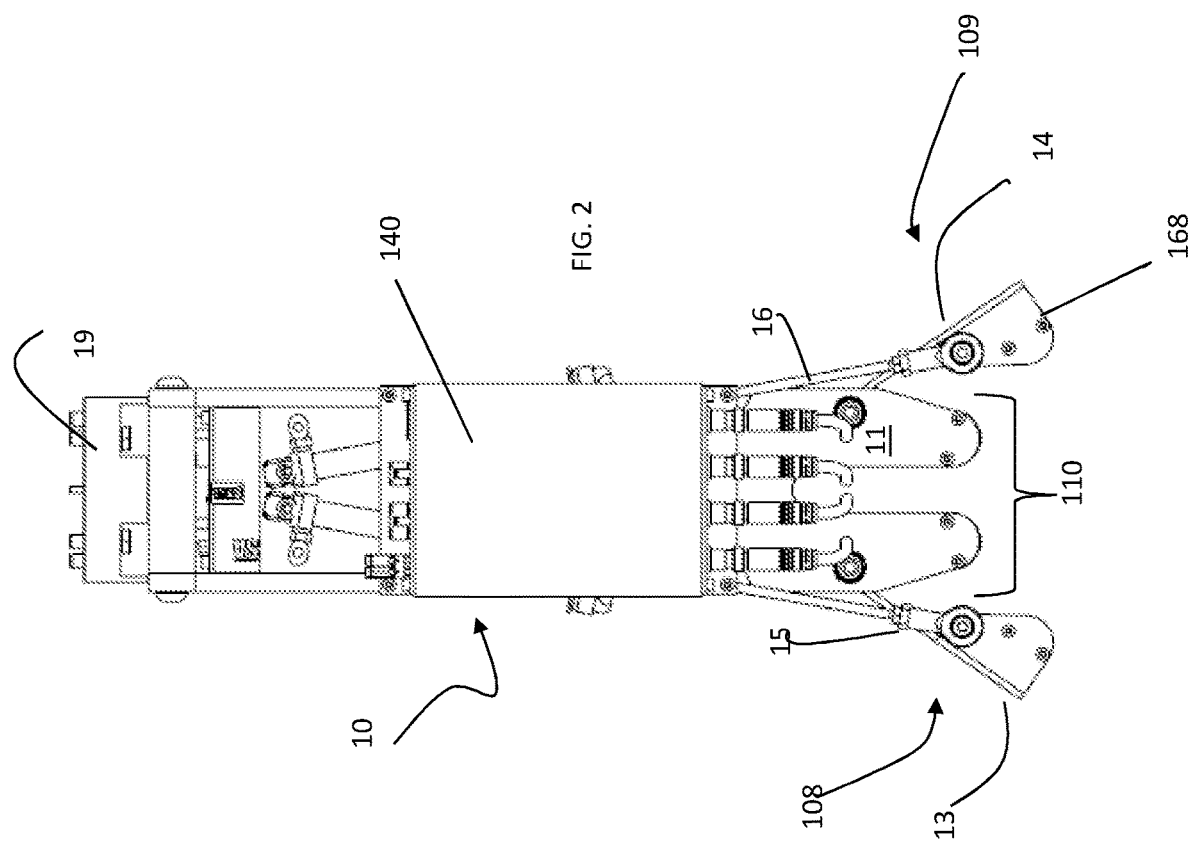

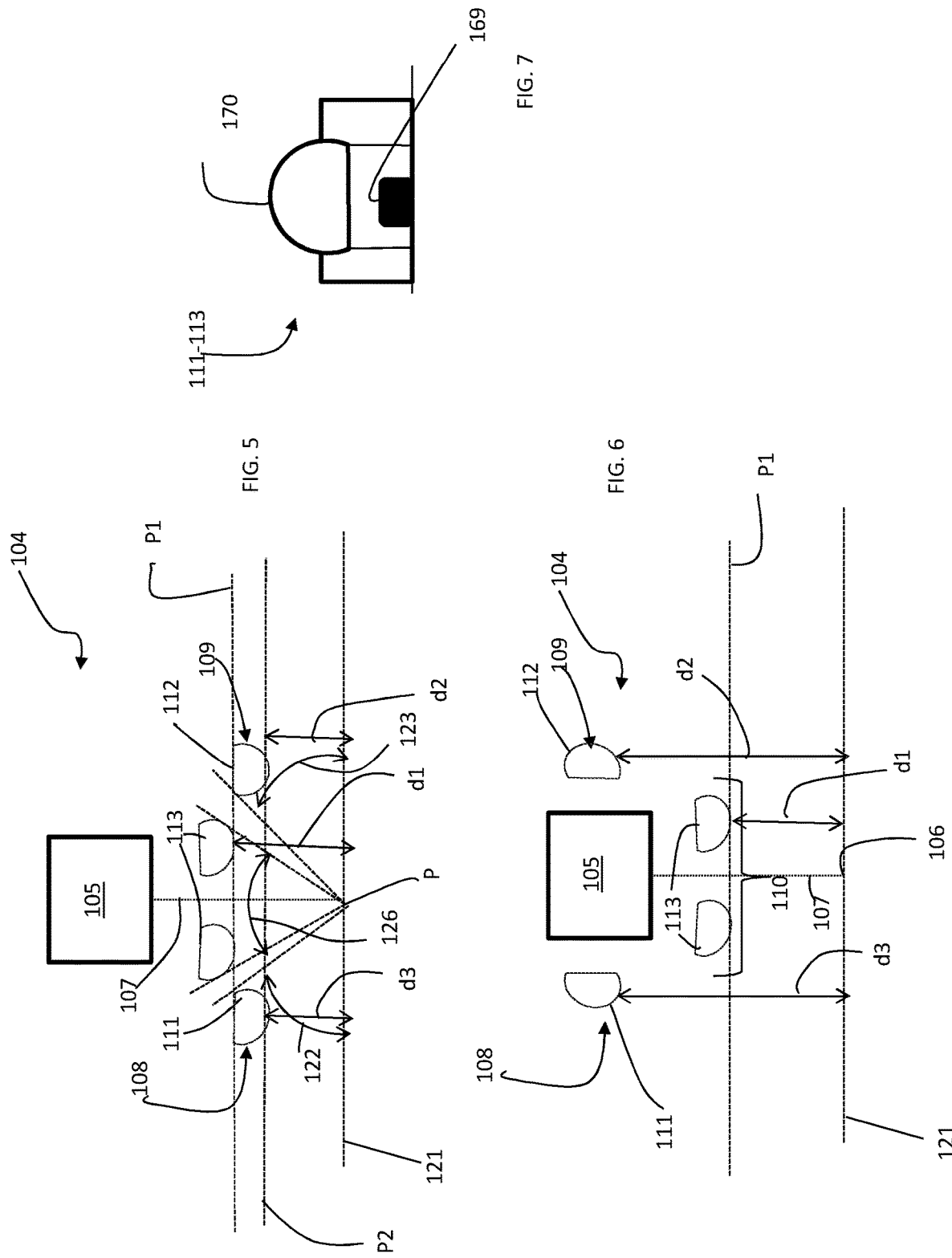

METHOD AND DEVICE FOR CHECKING TYRES

This application is a Section 371 national phase application based on International Application No. PCT/162016/057711, filed Dec. 16, 2016, and claims priority to Italian Patent Application No. UB2015A009593, filed Dec. 16, 2015; the content of each application is incorporated herein by reference.

The present invention concerns a method and a device for checking tyres, for example in a tyre production line, in particular a method and a device for checking for the possible presence of defects on, or close to, the surface of a tyre, more specifically on, or close to, the inner and/or outer surface of the side walls of a tyre. Typically, a tyre has a substantially toroidal structure about a rotation axis thereof during operation, and has an axial mid-plane perpendicular to the rotation axis, said plane typically being a plane of substantial geometric symmetry, ignoring possible minor asymmetries, such as the tread pattern and/or the internal structure.

Two portions of the tyre are identified here: the crown and the side walls. The crown comprises the tread band, the belt and the corresponding portion of carcass structure radially inside them.

The term "side wall" is meant to indicate one of the two portions of the tyre facing one another and that extend radially on opposite sides of the crown up to the beads, i.e. up to the two radially inner end edges of the tyre, having circular extension substantially perpendicular to the rotation axis; said beads being intended to each couple with a respective mounting rim. Each side wall thus comprises a corresponding portion of carcass structure and, in a position axially outside of it, a portion made of suitable elastomeric material, generally called 'sidewall'.

Typically, the carcass structure comprises at least one carcass ply having respectively opposite end edges engaged with respective annular reinforcing structures, generally called "bead wires", integrated in the areas identified above with the name beads. In "tubeless" tyres, the carcass ply is entirely coated with a layer of elastomeric material preferably butyl-based, usually called "liner" having excellent characteristics of impermeability to air and extending from one bead to another.

The structure of a side wall is also meant to entirely include the so-called "shoulder", i.e. the portion of the tyre for joining between the crown and the radially inner portion of the side wall (in other words, the two shoulders correspond to the two radially and axially outer circular 'edges' of the tyre). The shoulder has circular extension substantially perpendicular to the rotation axis.

The term "tyre" is meant to indicate, in combination or alternatively, both the finished tyre, i.e. the tyre at the end of the moulding and vulcanization steps after the manufacturing step, and the green tyre, i.e. the tyre complete with its components but not yet moulded and vulcanized.

The term homologous portions of the tyre is meant to indicate portions of the same component having the same geometry. For example, the different angular portions of the axially outer part of a side wall, the angular portions of surfaces of the shoulder in their circumferential extension, the corresponding portions of liner inside channels or ribs determined by the expansion bladder of the mould during moulding and vulcanization, etcetera, are homologous portions.

The term component of the tyre is meant to indicate any element that performs a function, or a portion thereof.

The terms "low", "high", "under" and "over" identifies the relative position of an element, like for example a component of a tyre, a tyre, an apparatus, a device, etc., with respect to the ground during use or of one of said elements with respect to another element.

The term "substantially parallel" relative to geometric elements (such as lines, planes, surfaces, directions, etc.) is meant to indicate that such elements form an angle of 0°+/−10°, preferably 0°+/−5°.

The terms outer or inner surface of the tyre, are respectively meant to indicate the surface that remains visible after the coupling of the tyre with its mounting rim and that which is no longer visible after said coupling.

The terms "optical", "luminous" and similar refer to an electromagnetic radiation used that has at least one portion of the spectrum falling within a widened range of the optical band, and not necessarily falling strictly within the optical band (in other words 400-700 nm), for example such a widened range of the optical band can extend from ultraviolet to infrared (for example wavelengths comprised between about 100 nm and about 1 µm). The terms "light" and "light radiation", unless specified otherwise, are used interchangeably.

In the present application a ray model of light radiation is adopted, i.e. it is presumed that light radiation incident on a point of a surface and generated by a non-pointed source (in which case there would be a single ray) corresponds to a set of light rays incident on the point and having rectilinear propagation direction that connects each point of the source with said point of the surface, where each of such rays has an associated fraction of the total light power incident on the point.

The term "directional light radiation" incident at a point of a surface is meant to indicate light radiation for which there is a solid angle having the point as vertex and amplitude less than or equal to $\pi/8$ steradians in which at least 75% of the total light power, preferably at least 90%, more preferably the entire light power falls.

The term "diffused light radiation" is meant to indicate a non-directional light radiation.

The term "grazing light radiation" incident at a point of a surface is meant to indicate a light radiation in which at least 75% of the total light power thereof incident on the point of the surface forms an angle of incidence less than or equal to 60° with a plane tangent to the surface at each said point.

The term "image" or synonymously "digital image" is meant to indicate in general a dataset, typically contained in a computer file, in which each coordinate (typically two-dimensional) of a finite set (typically two-dimensional and of the matrix type, i.e. N rows×M columns) of spatial coordinates (each typically corresponding to a pixel) is associated with a corresponding set of numeric values (which can be representative of magnitudes of a different type). For example, in monochromatic images (like those on the 'grayscale') such as set of values coincides with a single value in a finite scale (typically with 256 levels or tones), such a value for example being representative of the level of luminosity (or intensity) of the respective spatial coordinate when visualised, whereas in colour images the set of values represents the level of luminosity of multiple colours, or channels, typically the primary colours (for example in the RGB colour model red, green and blue, whereas in the CMYK colour model cyan, magenta, yellow and black). The term 'image' does not necessarily imply the actual visualisation thereof.

Every reference to a specific "digital image" (for example to a two-dimensional digital image initially acquired on the tyre) more generally covers any digital image that can be obtained through one or more digital processing operations of said specific digital image (like for example filtering, equalisation, "thresholding", morphological transformations—"opening", etc.,—gradient calculations, "smoothing", etc.).

The term "two-dimensional image" is meant to indicate a digital image each pixel of which has an associated piece of information representative of the reflectivity/diffusivity and/or of the colour of the surface, such as the images detected by common digital cameras.

The term "linear surface portion" is meant to indicate a surface portion having one dimension much larger than the other dimension perpendicular to it, typically greater by at least two orders of magnitude. The smaller dimension of the linear surface portion is typically smaller than or equal to 0.1 mm.

The term "linear image" is meant to indicate a digital image having a much greater number of columns of pixels than the number of rows, typically greater by at least two orders of magnitude. Typically, the number of rows is between 1 and 4 and the number of columns is more than 1000. The term "rows" and "columns" are used conventionally and are interchangeable.

The term "cycle time" within a production line comprising at least one work station, preferably a plurality of work stations, and inserted in a plant for producing tyres is meant to indicate, under normal operating conditions, the maximum transit time for a tyre being manufactured to pass through a work station in which at least one portion of a component of the tyre itself is built. For example, the cycle time can be comprised between about 20 and about 120 seconds.

WO 2015/004587 to the same Applicant shows a method and relative apparatus, for checking tyres in a production line, comprising: providing a tyre to be checked; elastically deforming a portion of side wall of the tyre through a compression force on an outer contact surface of the portion of side wall, the compression force having an axial direction and going towards the plane of the middle line; illuminating an inner and/or outer surface of the portion of side wall and detecting an image of the surface illuminated; generating a control signal representative of the image detected; and analysing the control signal in order to detect the possible presence of defects on the portion of side wall.

EP 2322899 describes a method for detecting minute irregularities on the surface of a tyre under inspection. A surface in the region of side wall of a tyre is illuminated by a red light emitted by first illumination means arranged in the direction of 45 degrees with respect to the line normal to the surface. At the same time, the surface is illuminated by a blue light coming from second illumination means arranged in a direction of −45 degrees with respect to the normal line. The illuminated surface is captured by a linear camera from the direction of the normal line. The surface irregularity formed on the surface of the tyre is detected based on the waveforms of luminance distribution.

US 2011/018999 shows a device for evaluating the appearance of the surface of a tyre comprising a linear colour camera including means for separating the beam of light reflected by the surface of said tyre and entering into the camera into at least two primary colours (R, G, B) of certain wavelengths, so as to direct the beam of light to as many sensors capable of obtaining an image in grayscale for each of the primary colours. The number of illumination means is equal to the number of primary colours, said illumination means being oriented so as to illuminate the surface to be evaluated at different angles. Each illumination means emits a coloured light (R, G, B) different from that emitted by the other illumination means, the wavelength of which substantially corresponds to the wavelength of one of the primary colours selected by the camera.

In processes for producing and building tyres for vehicle wheels there is a need to carry out quality controls on the products made, with the purpose of avoiding tyres that are defective or in any case outside of the design specifications from being able to be released onto the market, and/or of progressively adjusting the apparatuses and machinery used, so as to improve and optimise the performance of the operations carried out in the production process.

Such quality controls include for example those carried out by human operators who spend a predetermined time period, for example comprised between 30 s and 60 s, carrying out a visual and tactile examination of the tyre; if, in light of his/her experience and sensitivity, the operator suspects that the tyre does not meet certain quality standards, the tyre itself is subjected to further checks, through a more detailed human check and/or suitable apparatuses, in order to more deeply evaluate possible structural and/or quality deficiencies. In the field of tyre checks, the Applicant has set itself the problem of analysing the surface, inner and/or outer, of the tyre, through optical acquisition of images, for example digital, thereof and their subsequent processing, for example in order to detect the possible presence of defects visible on the surface, minimising the checking by human operators. The defects sought can for example be irregularities on the surface of a tyre (unvulcanised compound, alterations in shape, etc.), structural unevenness, cuts, cracks, presence of foreign bodies on the surface, etc.

The Applicant has observed that in order for the check to be able to be used "on line" within a tyre production plant, it is necessary for the check itself to be carried out in short time periods and with low costs.

Therefore, the method for checking the tyre through acquisition and analysis of images thereof to highlight possible defects thereof preferably takes a time period to complete it that is kept within the aforementioned limited "cycle time" period and at the same time ensures an accurate verification of the presence of defects in the tyre itself, at reasonably low cost.

The Applicant has observed that although the above documents in some cases effectively describe devices that can be useful for detecting specific defects in a tyre, in order to detect a plurality of defects a different device would have to be used for each specific defect having specific characteristics for identifying the specific defect. The Applicant has in fact further observed through an analysis of the devices of the type illustrated in WO 2015/004587, EP 2322899 and US 2011/018999 that a specific type of illumination coupled with a camera or different sensor is preferred for the correct detection of a specific defect or of a (limited) plurality of specific defects among the various defects that can occur in a tyre. The Applicant has indeed understood that the use of the same device with the same illumination and camera for the analysis of the entire tyre would lead to the lack of detection, or very difficult detection, through image processing, of some defects and in particular of some two-dimensional defects, i.e. that do not involve an alteration of the height of the surface, like for example the cuts at matching edges.

However, the provision of a large number of different devices each with different characteristics to identify different defects increases the complexity of the tyre production line in the part dedicated to checking them and the costs thereof. Moreover, the provision of distinct devices requires continuous movement thereof towards the tyre when in analysis step and away from it when a different device is in analysis step. This increases the cycle time since the so-called "idle time" in which the translation of the unused devices takes place are substantial, even if necessary to avoid collisions or interference between distinct devices.

The Applicant has therefore set itself the problem of devising a method and a device for checking tyres capable of acquiring images of the surface of a tyre, in particular for detecting more than one type of defect on the surface of the tyre, which is suitable for application on line inside a tyre production line of a production plant, in other words suitable for being used to obtain reduced operating times and costs, and capable of providing reliable results.

The Applicant has therefore realised that having a detection system defining an optical plane and having at least three light sources, where two light sources are arranged on opposite sides of the optical plane and can be moved with respect to the third, makes it possible to vary the illumination of a portion of the surface of the tyre according to the type of defect that it is wished to look for and to the actual configuration of the illuminated surface, so as to adapt the acquisition of images to illumination conditions for example both in diffused light and in grazing light particularly useful for the purposes of the aforementioned checking of the tyre, or according to whether or not further devices are used, such as a thrusting element for the deformation of the tyre.

The Applicant has finally found that a device and a method providing for a first and a second illumination of a first surface portion and a second surface portion of the tyre, respectively, surface portions that can generally have different defects, with consequent acquisition of a first and at least a second image through a detection system, through the same device but in different illumination conditions, makes it possible to make the checking of the tyre fast. The first illumination of a first surface portion of tyre is done in a configuration in which a first radiation source is "close" to a focal plane on which or close to which the first surface to be illuminated is located. In this configuration, a second source and a third source of radiation present in the device are located a greater distance from the focal plane with respect to the first source. In this way, the device is particularly compact, since a single source arranged close to the first surface portion to be illuminated is capable of coming particularly close to the first portion itself. The second illumination foresees the movement of the second source and of the third source so that they are on the same plane or closer to the focal plane of the first source so as to be able to carry out an illumination of the second surface by means of at least the first source and at least one from the second source and the third source.

According to a first aspect, the invention relates to a device for checking a tyre.

Preferably, a detection system is provided comprising a camera having an optical plane passing through the camera and defining a focal plane.

Preferably, a first light source, a second light source and a third light source are provided adapted for emitting a first light radiation, a second light radiation and a third light radiation, respectively, to illuminate a surface portion of said tyre at or close to said focal plane, said second light source and said third light source being arranged at opposite sides with respect to said optical plane.

Preferably, said first light source is fixed with respect to said detection system and said second light source and third light source are adapted to be movable from a first inactive configuration where they are controlled to not emit said second light radiation and third light radiation and wherein the distance of said second light source and of said third light source from said focal plane is greater than the distance of said first light source from said focal plane to an active configuration in which they are adapted for emitting at least one among said second light radiation and said third light radiation and wherein the distance of said second light source and of said third light source from said focal plane is equal to or less than the distance of said first light source from said focal plane.

Preferably, the device comprises a drive and control unit adapted for activating said detection system to acquire a first image, and at least a second image of a first portion and of a second surface portion of said tyre in said inactive configuration and in said active configuration, respectively.

In accordance with a second aspect, the invention relates to a kit for checking a tyre.

Preferably, a device according to the first aspect is provided.

Preferably, a thrusting element is provided, configured to apply a force to a surface to be checked of said tyre when said second light source and third light source of said device are in said inactive configuration.

According to a third aspect, the invention relates to a tyre checking line.

Preferably, a support for a tyre is provided.

Preferably, a robotized arm is provided.

Preferably, a device according to the first aspect is provided coupled with said robotized arm.

According to a fourth aspect, the invention relates to a method for checking tyres.

Preferably, it is foreseen to provide a tyre to be checked.

Preferably, it is foreseen to illuminate a first surface portion of said tyre arranged at or close to a focal plane of a detection system with a first light radiation emitted by a first light source.

Preferably, it is foreseen to acquire, through said detection system, a first image of said first surface portion illuminated by said first light radiation.

Preferably, it is foreseen to move a second light source and a third light source from a first inactive configuration where they are controlled to not emit light radiation and wherein the distance of said second light source and of said third light source from said focal plane is greater than the distance of said first light source from said focal plane to an active configuration wherein they are adapted for emitting at least one between a second light radiation and a third light radiation and wherein the distance of said second light source and of said third light source from said focal plane is equal to or less than the distance of said first light source from said focal plane.

Preferably, it is foreseen to illuminate a second surface portion of said tyre arranged at or close to said focal plane with at least one among said first light radiation, said second light radiation and said third light radiation.

Preferably, it is foreseen to acquire, through said detection system, at least one corresponding second image of said second surface portion.

The Applicant considers that for the purposes of detecting defects in many portions of a surface of a tyre through acquisition and processing of optical images, it is particularly advantageous to make a device and a method that allow a variable illumination according to the type of defect sought and/or the position in the tyre where this defect is sought. In particular, it is particularly advantageous to be able, with one same device, to conduct illuminations and acquisitions of images that require a particularly compact device, for example in order to be able to get close to the surface portion of interest, as well as furthermore illuminations and acquisitions of images that require a plurality of light radiations, such as light radiations either having different characteristics, for example grazing and diffused, or coming from distinct points in space, like from two sides of the optical plane defined by the detection system. This irradiation through different light radiations is carried out by moving two light sources, from an inactive configuration in which they are "distant" from the surface portion to be illuminated that is located on or close to a focal plane of the detection system and where they do not emit light radiation, whereas a further source emits radiation to illuminate the aforementioned surface portion, to an active configuration in which they approach the focal plane, so as to be able to illuminate the preselected portion with two or more light radiations coming from distinct positions in space. In the inactive configuration, the device is particularly compact and this adapted for approaching for example particularly the portion illuminated or for going into positions in which the volume available in which movements of the device can be carried out is limited, whereas in the active configuration a varied and optimised illumination of the surface portion of tyre is possible.

The inactive configuration is particularly advantageous in the case of analysis with a kit including a thrusting element adapted for deforming a surface portion of the tyre that comprises at least in part the first surface portion to be illuminated and to be acquired in the form of an image. The defects sought can for example be irregularities on the surface of a tyre (unvulcanised compound, alterations in shape, etc.), structural unevenness, presence of foreign bodies on the surface. Among structural unevenness defects, so-called "carcass creep" are particularly critical, which are rare but potentially very dangerous defects, generated in the interface region between two portions of the tyre having different chemical-physical characteristics, like for example different compounds.

Such defects are in the form of small cuts, typically extending longitudinally, i.e. they follow the circular extension of the tyre, characterised by perfectly matching edges—between which there is no removal or lack of material, this being a characteristic that makes them particularly difficult to identify. The running can also involve structure of the tyre arranged close to the outer surface thereof.

By suitably deforming a first area of the tyre to be checked, it is possible to decrease the outer radius of curvature of a surface portion of the tyre adjacent to the previous one, thus placing greater emphasis on possible defects, in particular running at the sidewall, and other cuts to the shoulder or holes, since the accentuation of the normal outer convexity tends to 'open' the edges or perimeter of such defects, making them easier to identify in the subsequent processing of images.

The images detected of this adequately compressed first surface portion thus have a high quality and/or contain information in number and quality such as to allow a subsequent automatic processing of the latter in order to detect possible defects existing, making the algorithms for automatically detecting defects used for this purpose highly effective.

This type of defect, in order to be properly identified, requires an illumination of relative high power and close to the deformed portion of tyre, i.e. positioning of the device very close to the thrusting element, otherwise the cut opened by the thrusting element "closes" as soon as a distance is reached from the area in which the deformation takes place. The device in the inactive configuration has a compactness necessary for this closeness.

Moreover, the cycle time for the examination of a tyre with the device and the method of the invention is reduced since with one same device it is possible to look for different defects, without having to move one device away and bring another closer, creating "idle times" between one activity and another.

Moreover, the Applicant considers that making a tyre production line using the invention keeps down the costs relative to the checking of the tyres, since the use of the device according to the first aspect associated with a robotized arm limits the total number of devices for checking defects in the tyre, thanks to the different analyses able to be carried out by the same device. The total cost of the line is thus reduced.

The present invention, in at least one of the aforementioned aspects, can also have one or more of the preferred characteristics described hereinafter.

Preferably, at least one from said first image, and said at least a second image, is a two-dimensional image.

The Applicant has observed that in the "three-dimensional" images (i.e. each pixel of which is associated with information on the height of the surface, for example the images obtained with laser triangulation) some two-dimensional defects (i.e. that do not involve an alteration of the height of the surface, like for example cuts with matching edges) are difficult to detect, or actually undetectable, through image processing.

Moreover, the dimensional resolution of three-dimensional images, in particular in the height direction, is sometimes not sufficiently high as to detect defects that are not very pronounced. The Applicant has therefore worked out that it is advantageous to detect and analyse "two-dimensional" images (in addition or as an alternative to three-dimensional ones).

Preferably, said camera is a linear camera.

A linear camera allows the acquisition of two-dimensional and also linear images, i.e. with a "limited" number of pixels, facilitating the processing thereof.

Preferably, said camera is a colour camera.

A colour camera makes it possible to acquire information that depends on the type of light radiation hitting the surface portion of tyre analysed and thus allow a specific processing to identify defects.

Advantageously, in said active configuration, said second light source and said third light source are arranged symmetrically with respect to said first light source.

A symmetry in the sources, which are arranged at the two sides of the optical plane of the detection system, allows easier comparing of images obtained with the different types of illumination obtained by illuminating the second surface portion with the second and/or third light radiation.

Preferably, said first light source is arranged symmetrically with respect to said optical plane.

Preferably, said first light source includes a first sub-source and a second sub-source, said first sub-source and said second sub-source being arranged at opposite sides of said optical plane. As stated above, the symmetry of the sources with respect to the optical plane is preferred and is preferably also maintained by the arrangement of the first source that includes two sub-sources positioned at the two sides of the optical plane.

Preferably, said first light source is adapted for illuminating said first surface portion or said second surface portion with diffused light radiation.

Preferably, said second light source and third light source are adapted for illuminating said second surface portion with grazing light radiation. The provision of light sources emitting a light radiation having different characteristics on said first surface portion or second surface portion can make it possible to obtain, for substantially the same surface, images acquired each illuminated by a different radiation having distinct characteristics, which "highlights" certain different characteristics of the surface portion illuminated, thus allowing, with suitable algorithms, the images to be compared with each other and defects to be identified more easily, if present.

Preferably, said second light source or said third light source comprise a single sub-source. More preferably, said second light source and said third light source each comprise a single sub-source.

Preferably, said first light source or said second light source or said third light source defines a main direction of extension. More preferably, said first light source, said second light source and said third light source each define a main direction. Even more preferably, the main direction of the first light source is substantially parallel to the main direction of the second light source and of the third light source. In this way, the illumination of the lens line and the total bulk of the source group are optimised.

Preferably said light sources and/or light sub-sources have a dimension along the main direction of extension equal to at least double, more preferably at least one order of magnitude greater, than the dimension perpendicular to said main direction of extension.

Preferably, each of said light sources and/or light sub-sources has the dimension along said main direction of extension less than or equal to about 20 cm, more preferably less than or equal to about 15 cm.

Preferably, each of said light sources and/or light sub-sources has the dimension along said main direction of extension greater than or equal to about 5 cm.

Preferably, each of said light sources and/or light sub-sources has the dimension perpendicular to said main direction of extension less than or equal to about 3 cm, more preferably less than or equal to about 2 cm. The aforementioned dimensions allow the light sources and/or light sub-sources to be effectively configured to the lens line in the case of a linear camera and allow bulk to be reduced.

Preferably, said respective light sources and/or light sub-sources are structurally and/or dimensionally the same as each other. In this way, the source group is simplified in structure, operations and maintenance.

Preferably, said respective light sources and/or light sub-sources have rectilinear extension along the main direction of extension. In this way, a contribution is made to reducing the bulk whilst still maintaining high efficiency of illumination.

Advantageously, said main direction of extension is substantially parallel to the optical plane. In this way, an optimal illumination and acquisition of the image of the surface portion to be checked is obtained, in any case maintaining a compactness of the total dimensions of the device.

Preferably, said first light source, or said second light source or said third light source includes one or more light emitting diodes (LED). More preferably, said first light source or said second light source or said third light source include a number of light emitting diodes greater than or equal to 6.

The LEDs ensure high efficiency and thus a relative energy saving with respect to other sources of light radiation, and such high efficiency is also advantageous for the low generation of heat.

Advantageously, the LEDs also have a high operating time: they are less delicate than other sources and in any case each light source does not include a single diode, and therefore malfunctions of a part of the LED included in the in the sources are permissible, which is not possible with different types of sources of light radiation. LEDs finally advantageously ensure quick switching on and off.

Preferably, said drive and control unit is configured, in said inactive configuration, to switch said first light source on and off at a certain frequency.

Preferably, said drive and control unit is configured, in said inactive configuration, to activate said detection system so as to acquire said first image in synchrony with the switching on of the first light source.

Preferably, said drive and control unit is configured, in said active configuration, to switch at least one from said first light source, said second light source and said third light source on and off alternately.

Preferably, said drive and control unit is configured, in said active configuration, to activate said detection system so as to acquire said at least a second image in synchrony with the aforementioned switching on action.

The drive and control unit preferably controls both one or more light sources and the detection system so as to obtain one or more images, preferably two-dimensional, of the portion itself for each surface portion to be examined of the tyre, such as the first portion and the second portion. Relative to the first surface portion, in which the illumination takes place through the first source, the radiation coming from the first light source is preferably emitted at a certain frequency to limit the power emitted by the source and thus also the amount of heat dissipated. The image of the first portion illuminated—called first image—is acquired at the illumination thereof, i.e. when the first source emits radiation. For this purpose, temporal synchrony is therefore obtained between the switching on of the first light source and the acquisitions of the first images by the camera.

Relative to the second portion of tyre, in order to detect the defects thereof, for each second portion preferably at least two images are acquired by the detection system. These two distinct images are obtained by illuminating the second portion alternately with the first light source and one among the second light source and the third light source. This allows a comparison of different images of the same surface portion in different illumination conditions—for example grazing and diffused—in order to detect the defects thereof. Therefore, at least two distinct images are obtained, i.e. an image acquired through illumination with the first light source and an image acquired through illumination with the second light source or with the third light source, so as to have at least two available images in different illumination conditions.

More preferably, in said active configuration, said drive and control unit is adapted for controlling said detection system so as to acquire three distinct images, each image corresponding to the switching on of a different light source from said first light source, said second light source and said third light source.

Obtaining three images in different illumination conditions, central illumination, and from the two opposite sides to the optical plane, allows optimal processing of the same three images to detect defects.

Preferably, the device includes a first support, a second support and a third support, said second support and third support being hinged to said first support, said second light source and said third light source bring fixed to said second support and third support, respectively. The movement of the second light source and of the third light source preferably takes place by actuating a first hinging and a second hinging present between a first support fixedly connected to the detection system where the first light source is also advantageously fixed, and a second support and third support, respectively, movable with respect to the first.

Preferably, said camera is fixedly connected to said first support. More preferably, said camera is mounted on the first support.

Preferably, said drive and control unit is fixedly connected to said camera. Given the preferred high frequency in which the light sources are alternately activated, the Applicant considers that delays in the control signals can be minimised by positioning the drive and control unit substantially "close" to light sources and camera.

More preferably, said second light source or said third light source are fixed to said second support or said third support, respectively, through a thermo-conductive paste. Even more preferably, said second light source and said third light source are fixed to said second support and said third support, respectively, through a thermo-conductive paste.

More preferably, said first light source is fixed to said first support through a thermo-conductive paste.

More preferably, said first support or said second support or said third support is made at least partially from aluminium. Even more preferably, the first support, the second support and the third support are made at least partially from aluminium.

More preferably, said first support, or said second support, or said third support comprises a heat dispersion fin arrangement. Considering that in a tyre, in order to detect defects on the surface, there is often the need to illuminate shaded or undercut surface portions and in any case that are often black in colour, the light sources need to generate a large amount of light that entails a negative side effect—the generation of heat with relative high temperatures. For this reason, preferably at least one light source and preferably all of the light sources, include a support. Advantageously, each support is made of aluminium due to its lightness and heat conductivity, and preferably includes a finned arrangement for cooling. Furthermore, in order to maximise the heat transfer, a thermo-conductive paste, typically used in chips, is also used to obtain an area with large heat exchange between any two contact surfaces in the device.

Preferably, an angle formed by said focal plane and a plane joining an intersection line between the optical plane and the focal plane and a point of said second light source or of said third light source is greater than or equal to about 55°. In this way, the radiation that illuminates each point of the second surface portion is substantially grazing.

Preferably, said first light source or said second light source or said third light source includes a converging lens adapted for narrowing an emission field angle of said first light radiation or of said second light radiation or of said third light radiation to a value comprised between about 10° and about 50°. More preferably, each of said first light source, said second light source and said third light source includes a converging lens adapted for narrowing an emission field angle of said first light radiation, of said second light radiation and of said third light radiation to a value comprised between about 20° and about 30°.

The choice of the light emission angle by the light source influences the result of the final light intensity. For the same effective intensity of the LED, the greater than emission angle the better the radiation emitted on the surface portion is distributed, but on the other hand the worse the light intensity. Since the light sources are relatively close to the surface portions to be examined and illuminated, the Applicant considers it advantageous to use one (or more) lenses suitably designed with the purpose of concentrating the beam of light radiation so as to considerably increase the light intensity thereof in the surface portion to be illuminated. An emission angle comprised between about 20° and about 30° allows an optimal compromise between a uniform radiation and a sufficient intensity in the surface portion of tyre to be illuminated.

Advantageously, said second light source and said third light source in said active configuration are coplanar and define a plane substantially parallel to the focal plane.

More preferably, in said active configuration, a distance between a plane parallel to said focal plane and passing through said first light source and a plane parallel to said focal plane and passing through said second light source and said third light source is comprised between about 0 mm and about 50 mm.

In this way, an optimal illumination of the surface portion to be illuminated is obtained, preferably with diffused light and grazing light.

Preferably, said thrusting element is adapted for applying a deformation to said tyre dependent on a selected type of tyre to be checked.

Not all tyres have the same characteristics of size and flexibility. Therefore, the deformation imparted by the thrusting element is preferably correlated to the type, and therefore to the characteristics, of the tyre to be checked. When the type of tyre is known, the thrust to be imparted is set.

Preferably, said surface to be checked includes at least in part said first surface portion.

The deformation of a surface portion of the tyre highlights defects, like for example cuts, which are generally not visible otherwise. It is thus preferred for an illumination of a first surface portion that is also deformed, i.e. forms part of the surface to be checked, to be carried out.

Preferably, the distance between said first light source and said thrusting element is comprised between about 20 mm and about 60 mm.

For the visualisation of defects in the deformed surface, since the defect is visible more where the deformation is greater, it is preferable to get as close as possible both to the deformed surface and to the thrusting element. Preferably, the optimal distance is comprised between about 25 mm and about 45 mm.

Preferably, said thrusting element is adapted for applying a substantially constant force on said surface to be checked.

Preferably, said thrusting element is adapted for applying a substantially constant deformation on said surface to be checked.

Preferably, the production line includes a rotation system adapted for setting said tyre and said robotized arm in relative rotation with respect to one another so as to modify an angular position of said first and of said second surface portion of said tyre with respect to said robotized arm. More preferably, said tyre is set in rotation with respect to said robotized arm.

The relative rotation between tyre and robotized arm allows the 360° checking of the tyre itself. Advantageously, for the sake of simplicity, the tyre is rotated instead of the detection system: the rotation of the detection system could indeed damage it or could result in inaccurate acquisition of the images due to vibrations induced by the continuous movement.

Preferably, a thrusting element is foreseen that is configured to apply a force to a surface to be checked of said tyre when said second light source and third second light source of said device are in said inactive configuration.

Preferably, said drive and control unit is configured to control said detection system to acquire a plurality of said first image or said second image at predetermined time intervals during a rotation of 360° of said tyre carried out by said rotation system.

In this way, the tyre is controlled in its entirety.

Advantageously, said thrusting element is adapted for applying a force to a surface forming part of a shoulder or of a sidewall of said tyre.

The Applicant has found that the defects most highlighted through compression are generally present at the shoulder or the sidewall of the tyre, and therefore advantageously the pressure or the thrust by the thrusting element is exerted in one or both of these areas.

Preferably, it is foreseen to process said first image or said at least a second image, so as to detect possible defects in said first surface portion or second surface portion of said tyre.

Preferably, it is foreseen to arrange said second light source and said third light source at opposite sides of an optical plane defined by said detection system.

Preferably, said first surface portion is an outer surface portion of a sidewall or of a shoulder of said tyre.

Defects in this area of sidewall or shoulder require an illumination "from up close" and therefore the device in inactive configuration, i.e. compacted, is preferred.

Preferably, said second surface portion is a surface portion of a bead of said tyre.

The defects in the bead are particularly complex to detect. Therefore, a plurality of different illuminations is used, using the device in active configuration where the first light source, the second light source and the third light source are adapted for illuminating the second surface portion.

Preferably, it is foreseen, between illuminating said first portion of said tyre and illuminating said second portion of said tyre, to translate or rotate said detection system from a first operative position to a second operative position.

The first surface portion and the second surface portion of tyre are at least partially distinct from one another, and therefore a movement of the device is preferable, so as to go into the optimal illumination position of the second surface portion of the tyre, after having illuminated the first.

Preferably, it is foreseen to illuminate said first surface portion through said first light radiation by switching said first light source on and off at predetermined intervals; and to synchronise said detection system so as to acquire said first image in synchrony with said switching on of said first light source.

Preferably it is foreseen to illuminate said second surface portion through at least one from said first light radiation, said second light radiation and said third light radiation correspondingly switching at least one among said first light source, said second light source and said third light source on and off at predetermined intervals; and to synchronise said detection system so as to acquire said at least a second image in synchrony with said switching on of at least one from said first light source, said second light source and said third light source.

Preferably, illuminating said second surface portion includes illuminating said second surface portion with said first light radiation; illuminating said second surface portion with said second light radiation at a different time with which said first light radiation illuminates said second surface portion; and illuminating said second surface portion with said third light radiation at a different time with which said first light radiation illuminates said second surface portion and said second light radiation illuminates said second surface portion.

Preferably, the second surface portion is illuminated with at least two different types of light radiation, even more preferably with three different types of light radiation, coming from the first light source, from the second light source and from the third light source. This allows a comparison of three distinct images and processing thereof with suitable algorithms in order to highlight the possible defects in the second surface portion.

More preferably, acquiring said second image includes acquiring a first image to be processed when said second portion is illuminated by said first light radiation; acquiring a second image to be processed when said second portion is illuminated by said second light radiation; and acquiring a third image to be processed when said second portion is illuminated by said third light radiation.

Acquiring said at least a second image of a second portion therefore advantageously includes acquiring three distinct images to be processed of this second portion. The three images to be processed, two preferably in grazing light and one in diffused light, are thus advantageously processed to identify defects. Each image is preferably acquired when a different light source is switched on.

Even more preferably, said first image to be processed, said second image to be processed and said third image to be processed are made up of a respective plurality of first linear images, second linear images and third linear images of a succession of linear surface portions, contiguous to one another or partially overlapping, said first linear images, second linear images and third linear images being acquired on each linear portion of said succession of linear portions illuminated, respectively, by said first light radiation, second light radiation and third light radiation in alternate sequence.

Advantageously, said first image, said second image or said images to be processed are digital images. More preferably they are images formed from matrices of pixels. Even more preferably they are linear images.

Preferably, said first image is made up of a respective plurality of fourth linear images of a succession of linear surface portions, contiguous to one another or partially overlapping, said fourth linear images being acquired on each linear portion of said succession of linear portions respectively illuminated by said first light radiation. A type of detection system for acquiring images is for example a linear camera defining a lens line, intersection of the lens plane on a focal plane in which or close to which the first surface portion or the second surface portion is preferably arranged when illuminated. The linear portions are therefore preferably surface portions able to be obtained close to said lens line in temporal succession. For example, such a succession of linear portions can be obtained by rotating the tyre about a rotation axis thereof, or by rotating the detection system and the light sources about the tyre. Preferably, at least one complete rotation of 360° is completed.

The type of defects searched for in the second surface portion of the tyre is preferably identified by comparing images acquired through the detection system in different illumination conditions, like through the first light radiation, the second light radiation and the third light radiation, so that the defect is detectable for example through a "subtraction" of the characteristics detectable in one image with respect to another.

Advantageously, it is foreseen to switch said first light source on at a different time with respect to the switching on of said second light source and of said third light source.

In this way, each image to be processed acquired of the second surface portion is relative to a single predetermined illumination.

Preferably, it is foreseen to compare said first image to be processed, second image to be processed and third image to be processed substantially of the same second surface portion of tyre so as to detect defects in said second surface portion.

The three distinct images acquired to be processed are each with a different type of illumination. This allows a comparison of three distinct images and their processing with suitable algorithms in order to highlight the possible defects in the second surface portion.

Preferably, it is foreseen to rotate said tyre about its rotation axis, and to illuminate a surface portion of said tyre in a plurality of angular positions of said tyre so as to obtain a plurality of first images and of second images at different angular positions, a first image and at least a second image for each angular position of said tyre.

Preferably, illuminating with a first light radiation comprises illuminating said first surface portion with a first diffused light radiation.

Preferably, illuminating with a second light radiation or with a third light radiation comprises illuminating said second surface portion with a second light radiation or a third grazing light radiation.

The first light source preferably emits, on the first surface portion or on the second surface portion, a radiation that, at the level of the first surface portion or second surface portion, is diffused, whereas the second light source or the third light source emit a radiation on the second surface portion that, at the level of the second surface portion, is grazing. The first surface portion, deformed by the compression, preferably only needs diffused light to identify defects, whereas the second portion preferably needs an illumination with two different types of radiation, grazing and diffused, so as to obtain the acquisition of at least two images for the same second surface portion, each with different illumination, which can be compared with each other to identify defects on the second surface portion.

Preferably, it is foreseen, before illuminating said first surface portion of said tyre, to elastically deform a surface of said tyre to be checked including at least in part said first surface portion through a compression force.

Further characteristics and advantages will become clearer from the detailed description of some example, but not exclusive, embodiments of a method and a device for checking tyres, in accordance with the present invention. Such a description will be outlined hereinafter with reference to the attached figures, provided only for indicating and therefore not limiting purposes, in which:

BRIEF DESCRIPTION OF THE DRAWINGS

FIG. 2 shows a view from above of the device of FIG. 1a in the active configuration;

FIG. 3 shows a front view of the device of FIG. 1a in the active configuration;

FIG. 5 shows a partial and schematic side view of a detail of the device of FIG. 1a in the active configuration;

FIG. 6 shows a partial and schematic side view of a detail of the device of FIG. 1b in inactive configuration;

FIG. 7 shows a schematic side section view of a detail of the device of FIG. 1a or 1b;

FIG. 11 shows the apparatus of FIG. 8 in which the device according to the invention is in the active configuration of FIG. 1a.

Figure 1A:
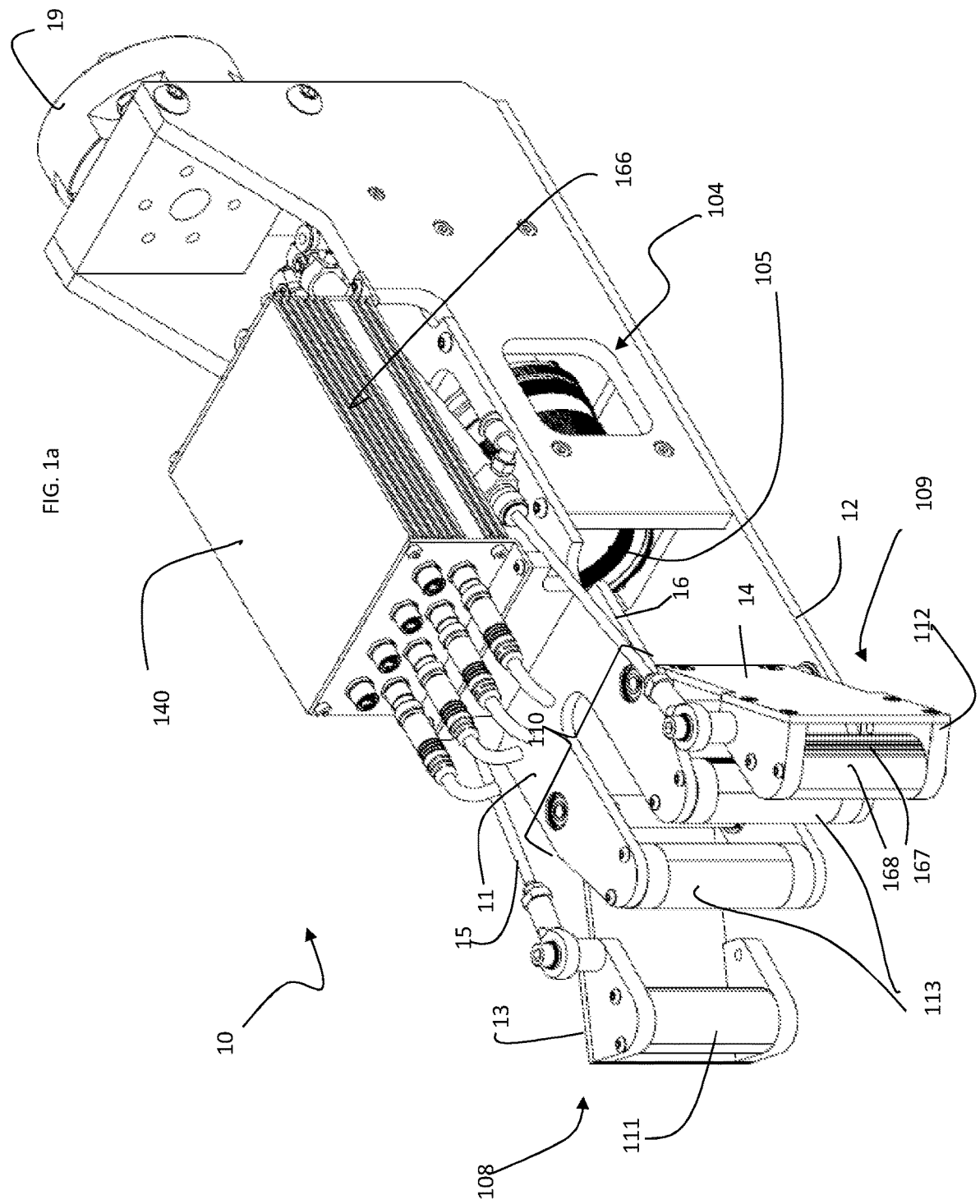
FIG. 1a shows a perspective view of a device for checking tyres in an active configuration in accordance with the present invention.

With reference to the figures, reference numeral 10 generally indicates a device for checking tyres 200 in accordance with the present invention.

Figure 1B:
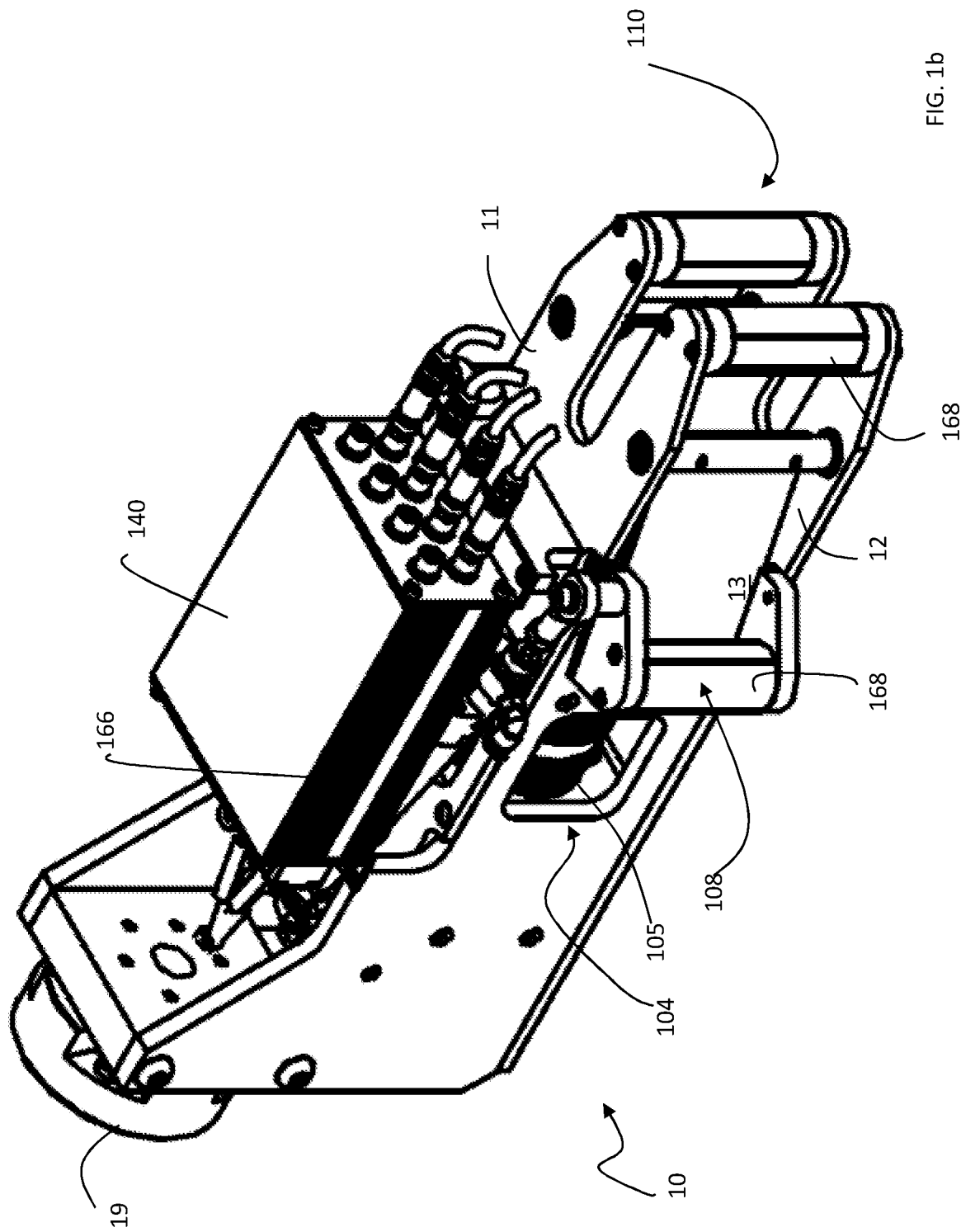
FIG. 1b shows a perspective view of the device for checking tyres of FIG. 1a in inactive configuration.
Figure 4:
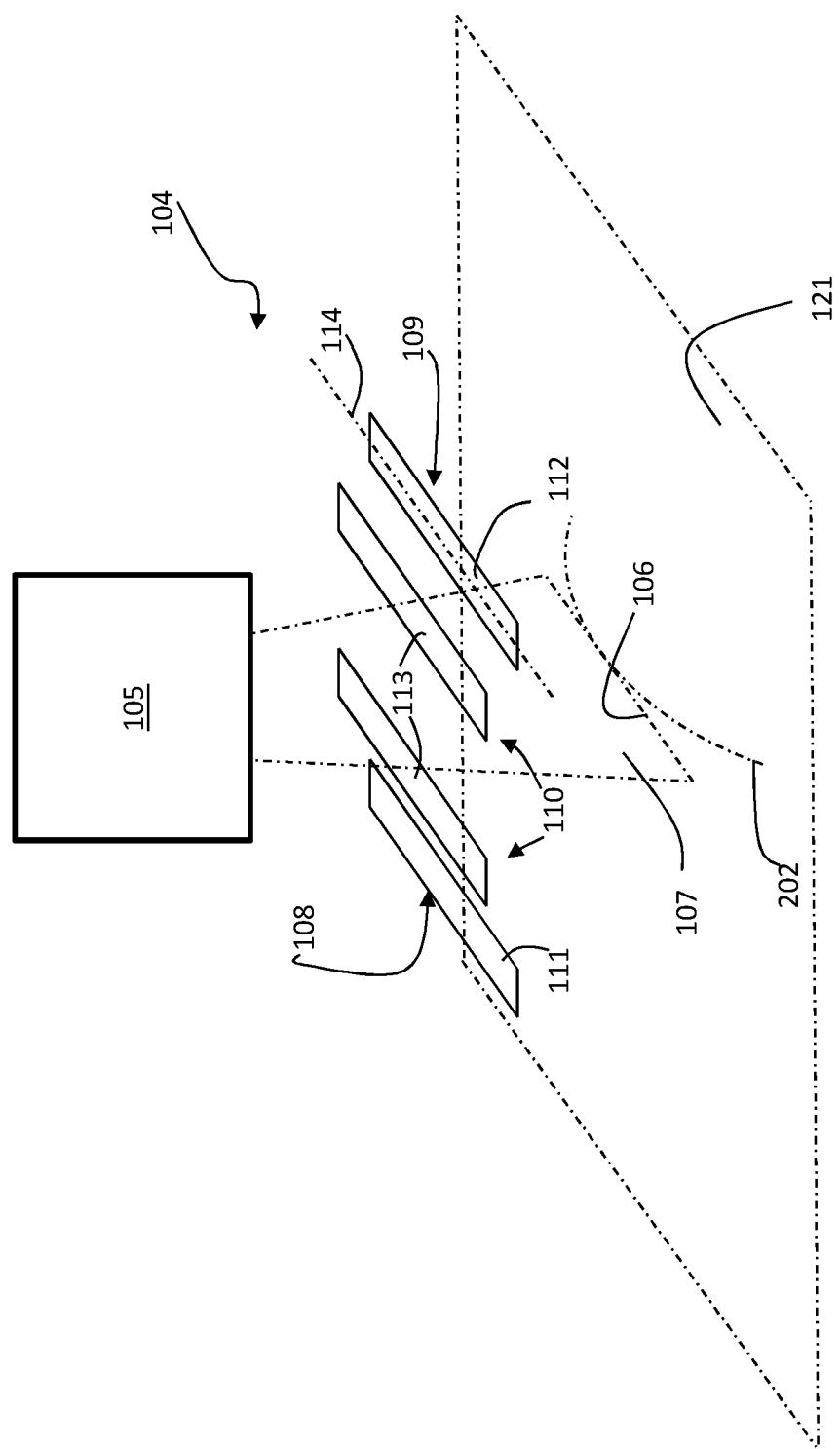
FIG. 4 shows a perspective partial and schematic view of a detail of the device of FIG. 1a in the active configuration.

Preferably, with initial reference to FIGS. 1a, 1b and 4, the device 10 comprises a detection system 104 including a camera 105. Preferably, the camera 105 is a linear camera having a lens line 106 laying on an optical plane 107 passing through the linear camera (visible in FIG. 4). The present invention also considers the alternative case in which the camera is of a different type, like for example an area camera. In this case, the surface portion illuminated and acquired is also of the area type. Moreover, the camera 105 defines a focal plane 121 in which a portion to be illuminated of tyre surface is focused upon. Preferably, the optical plane 107 and the focal plane 121 are perpendicular to each other (visible in FIGS. 4, 5 and 6).

Figure 8:
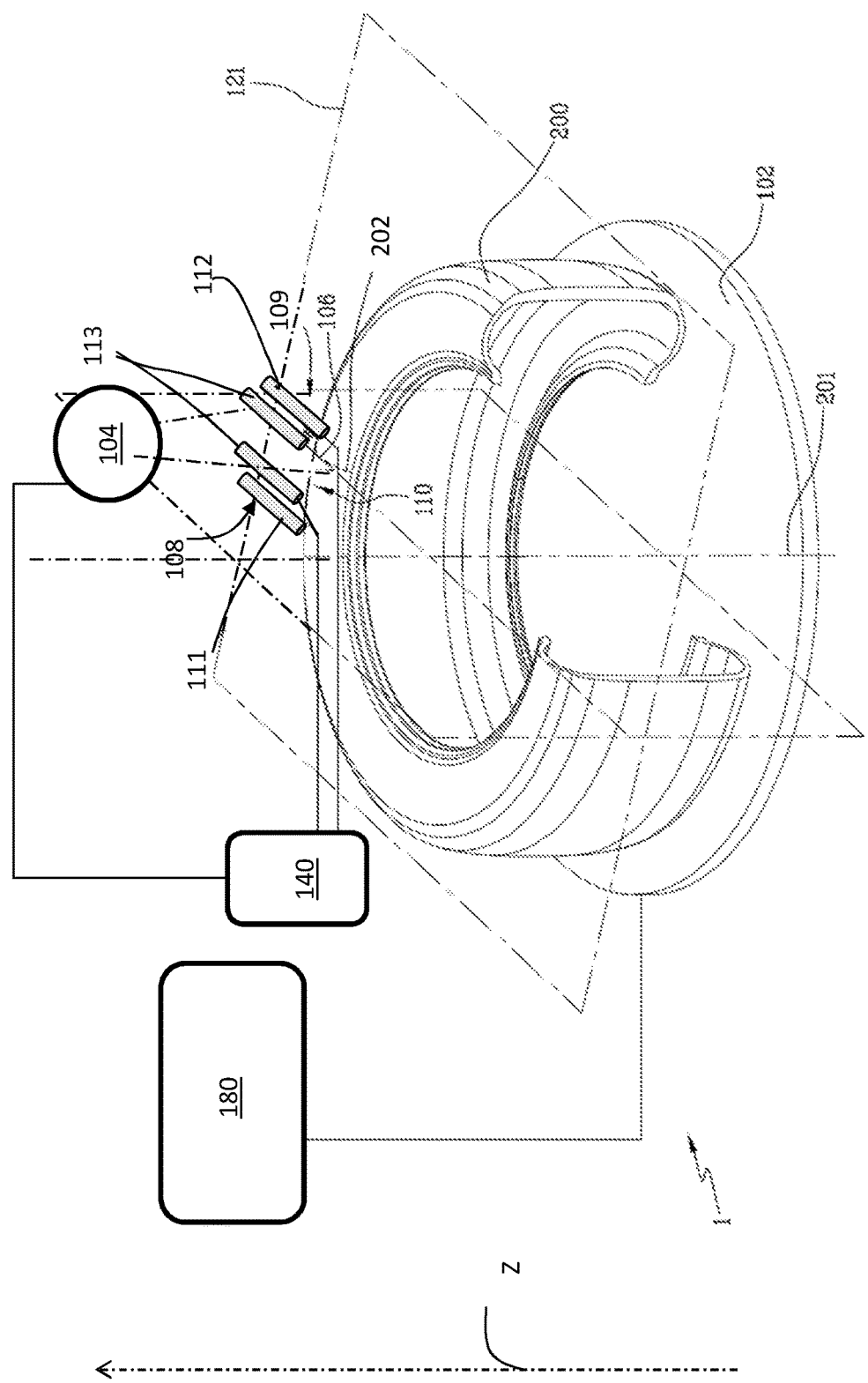
FIG. 8 shows a partial and schematic perspective view, partially in section and partially in terms of functional blocks, of an apparatus for checking tyres in a tyre production line.

The device 10 also comprises a first light source 110, a second light source 108 and a third light source 109 adapted for emitting a first light radiation, a second light radiation and a third light radiation, respectively, to illuminate a linear surface portion 202 (visible in FIG. 4) of said tyre 200 coinciding with the lens line 106 (for example when the surface portion is planar) or close to the lens line (due to the curvilinear shape of the surface of the tyre), as shown in FIGS. 4 and 8.

The detection system through the camera 105 is adapted for acquiring a respective two-dimensional digital image of the linear surface portion illuminated 202 by at least one from the first light radiation, the second light radiation and the third light radiation.

Preferably, the second light source 108 and the third light source 109 each consist of a single respective sub-source 111 and 112, the two sub-sources being positioned symmetrically with respect to the optical plane 107. Preferably, the two sub-sources 111 and 112 respectively sit on opposite sides with respect to the optical plane and are equidistant from it.

Preferably, the first light source 110 consists of two respective sub-sources 113 distributed on both sides of the optical plane 107 and symmetrically with respect to such a plane.

Each sub-source 111-113 has a respective main direction of extension (indicated as an example with the broken lines 114 in FIG. 4) which preferably extends substantially parallel to the optical plane 107 and thus to the lens line 106.

As an example, the sub-sources have a dimension along the main direction of extension 114 equal to about 6 cm and a diameter perpendicular to the aforementioned main direction of extension 114 equal to about 2.5 cm.

Each sub-source typically comprises a plurality of LED sources 169 arranged aligned along the main direction of extension 114. As an example, as can be seen in FIG. 7, each sub-source 111-113 comprises, positioned above each LED light 169, a converging lens 170, adapted for converging the light beam emitted by the LED light by about 30°. The light beam emitted by each LED light 169 is therefore restricted preferably within an angle equal to about 20°.

Each light source 108, 109, 110 also includes a support, preferably made from aluminium, on which the LEDs 169 are fixed. The supports are all indicated with 168 in the attached figures (see FIGS. 1a, 1b, 2 and 3).

Preferably, the LEDs 169 are fixed to the respective support 168 through a thermo-conductive paste (not visible in the figures). Advantageously, each support 168 also includes, in an outer surface not in contact with the LEDs, a fin arrangement 167 for the dissipation of heat, visible in FIG. 1a.

The first and the second sub-source 113 of the first light source 110 are positioned between two plates 11, 12 arranged substantially perpendicular to the main direction of extension 114 of the first light source 110 and substantially parallel to each other. Between the two plates 11, 12, which extend upstream of the first light source in the direction of emission of the light, the linear camera 105 is also positioned.

A third plate 13 and a fourth plate 14 are hinged to these two plates 11, 12, so that the respective rotation axis thus defined is substantially parallel to the main direction of the first light source 110 or second light source 108 or third light source 109. The second light source 108 is fixedly connected to the third plate 13, whereas the third light source 109 is fixedly connected to the fourth plate 14.

Third plate 13 and fourth plate 14, are moved in rotation respectively by a first pneumatic piston 15 and a second pneumatic piston 16. Each pneumatic piston 15, 16 is connected at one end to the plate to be moved, and at the other end to the first light source 110 and to the camera 105, i.e. to the first plate 11 or to the second plate 12.

The movement of the plates 13, 14 through the pistons means that the device 10 can be brought into an active configuration such as that of FIGS. 1a, 2 and 3 in which the second light source 108 and third light source 109 are brought "forwards", i.e. they are further from the camera 105 with respect to the first light source 110 and closer to the tyre surface 200 to be illuminated, i.e. closer to the focal plane 121 with respect to the first light source 110 (as described in detail hereinafter), or in an inactive configuration, such as the one represented in FIG. 1b, in which the second light source 108 and the third light source 109 are positioned further away with respect to the focal plane 121, and substantially folded parallel to the optical plane 107 to minimise a bulk given by the device 10 in a direction perpendicular to the optical plane 107.

Preferably, in the active configuration, as can be seen more clearly from FIG. 3, the sub-sources 111-113 of the first light source 110, second light source 108 and third light source 109 are arranged so that for their entire extension in a view perpendicular to the optical plane 107 they sit between two planes perpendicular to the lens line 106. In other words, all of the first and second ends of the sources 108, 109 and 110 with respect to the main direction of extension 114 sit on a respective plane perpendicular to the lens line 106.

Preferably, the device 10 comprises a drive and control unit 140 configured to selectively activate one or more of said first light source 110, second light source 108 and third light source 109 and activate the linear camera 105 to acquire a respective two-dimensional digital image (in colour or monochromatic) of the linear surface portion, preferably in synchrony with the activation of one or more of said first light source 110, second light source 108 and third light source 109.

Preferably, the drive and control unit 140 is fixed to a support plate 11, 12 of the first light source 110 and camera 105 so as to send signals relative to the control of the light sources 108, 109, 110 without waiting times. Preferably, moreover, the drive and control unit 140 is adapted for controlling the second light source 108 and the third light source 109 to not emit any radiation when in the inactive configuration and to emit light radiation when in the active configuration.

Preferably, a processing unit 180 (visible schematically as a functional block in FIG. 8) is adapted for controlling the pistons 15, 16 so as to move the second light source 108 and the third light source 109.

For greater heat dissipation, moreover, the drive and control unit 140 also comprises a fin arrangement 166 (visible in FIGS. 1a and 1b).

With reference now to FIGS. 4, 5 and 6, the light sub-sources 111-113 are schematically shown with reference to their respective emitting surface (in the figures as an example having a semi-cylindrical shape and therefore having a semi-circular shape in section), which can for example coincide with a transparent protective glass sheet and/or diffusor.

In FIGS. 4 and 5 the device 10 is shown in the active configuration.

In this configuration, preferably the distance of each of the sub-sources 113 of the first light source 110 from the optical plane 107 is less than the distance between each sub-source 111, 112 of said second light source 108 and third light source 109 and the optical plane 107.

Advantageously, in the active configuration, the distance $d_1$ between the first source 110 at the sub-sources 113 and the focal plane 121 is greater than the distance $d_2$ or $d_3$ of the second or third light source from the focal plane 121. More preferably $d_1$ is greater both than $d_2$ and than $d_3$. Preferably $d_2=d_3$.

More preferably, the two sub-sources 113 of the first light source 110 are coplanar and define a plane P1 substantially parallel to the focal plane 121, being a distance $d_1$ from it. The plane P1 can be defined as the plane passing through the points of both of the sub-sources 113 at minimum distance from the focal plane 121 (as represented in FIG. 5), or the plane passing through a middle line of both of the sub-sources 113.

Preferably, the sub-sources 111 and 112 of the second and of the third light source 108, 109, respectively, are also coplanar defining a plane P2 substantially parallel to the focal plane 121 and being a distance $d_2$ from it. Like for P1, the plane P2 can be defined as the plane passing through the points of both of the sub-sources 111 and 112 at minimum distance from the focal plane 121 (as represented in FIG. 5), or the plane passing through a middle line of both of the sub-sources 111-112.

As an example, in the active configuration, the distance $d_1$ is equal to about 77 mm.

As an example, the distance $d_1-d_2=d_1-d_3$ is equal to about 32 mm (77 mm-45 mm).

As an example, for each point P (as an example indicated at an end in FIG. 5) of the lens line 106 a respective angle 126 (in FIG. 5 shown with reference to a sub-source 113) having vertex in point P and sitting in a plane perpendicular to the lens line, and subtended by each of the sub-sources, is equal to about 50°.

As an example, taking the focal plane 121 perpendicular to the optical plane 107 and passing through the lens line 106, the respective maximum angle 122 and 123 between all of the angles formed between the focal plane and the planes passing through the lens line and all of the points respectively of the second light source 108 and of the third light source 109 (respectively of the sub-sources 111 and 112) is greater than or equal to about 55°.

Preferably, the first light source 110 is suitable for illuminating the lens line 106 with diffused light.

As an example, a respective angle 126 having vertex in each point P of the lens line 106 and sitting in a plane perpendicular to the lens line, and subtended by the first light source, is equal to about 50°. In this way, a solid wide angle of the diffused light is obtained.

Preferably, the second and third light source 108, 109 are suitable for illuminating the lens line 106 with grazing light.

In the inactive configuration of FIG. 6, the second and third light source 108, 109 are positioned so that the distance between one of them, and more preferably between both of the sources, and the focal plane 121, $d_2$ and $d_3$ is greater than the distance $d_1$ between the sub-sources 113 of the first light source 110 and the focal plane 121. Preferably, the distance $d_1$ between both of the sub-sources 113 and the focal plane 121 is the same, in other words also in this configuration preferably the sub-sources 113 form a plane P1 substantially parallel to the focal plane 121.

Preferably, in the inactive configuration, the distance $d_1$ is equal to about 77 mm.

The operation of the device 10 is as follows. A first surface portion to be checked (always indicated with 202) is selected in the radially outer surface of the tyre. Preferably, but not exclusively, this portion belongs to the shoulder or to the sidewall of the tyre 200. In the inactive configuration of FIGS. 1b and 6, the drive and control unit 140 controls the second and third light source 108, 109 to not emit any radiation. The device 10 is particularly compact for positioning the light sources 108 and 109 substantially parallel to the optical plane 107. Furthermore, the drive and control unit 140 controls the first light source 110 to emit a diffused radiation on the first surface portion 202 of the tyre 200, for example at a predetermined frequency. Such a stroboscopic frequency is for example equal to 0.1 ms. The drive and control unit 140, furthermore, controls the camera 105 to acquire an image of the first surface portion illuminated by the first light source in synchrony with the illumination thereof. Therefore, an image of the first surface portion of tyre 200 illuminated is acquired by the camera 105 each time the first light source 110 that illuminates the portion with diffused light is switched on.

Furthermore, a second portion of the outer surface of the tyre 200 to be checked is selected. Preferably, but not necessarily, this second portion belongs to the bead of the tyre 200. The processing unit 180 controls the pistons 15, 16 so as to bring the second light source 108 and the third light source 109 in the active configuration of FIGS. 1a, 4 and 5. Furthermore, the drive and control unit 140 controls the first light source 110, the second light source 108 and the third light source 109 to emit a radiation on the second surface portion 202 of the tyre 200. Preferably, the first source 110 emits diffused radiation on the second surface portion, whereas the second light source 108 and the third light source 109 both emit grazing radiation, but coming from opposite half-spaces with respect to the optical plane 107. Preferably, all three of the light sources emit light radiation to illuminate the second surface portion of tyre, for example at a predetermined frequency. Such a stroboscopic frequency is for example equal to 0.1 ms. Preferably, the three light sources are alternately switched on, i.e. in a given time period only the first or the second or the third light source illuminates the second surface portion of tyre. The drive and control unit 140 preferably also controls the camera 105 so as to acquire an image of the second surface portion illuminated by the first or second or third light source in synchrony with the illumination thereof. Therefore, advantageously, the camera 105 acquires an image of the second surface portion of tyre 200 illuminated the camera 105 every time the first light source 110 that illuminates the second portion with diffused light is switched on, an image of the second surface portion of tyre 200 illuminated every time the second light source 108 that illuminates the second portion with grazing light from one side of the optical plane 107 is switched on and an image of the second surface portion of tyre 200 illuminated every time the third light source 109 that illuminates the second portion with grazing light from the other side of the optical plane 107 is switched on. In this way, advantageously, for each second surface portion three distinct images to be processed are acquired in which the same portion is illuminated with a radiation having distinct characteristics.

Preferably, the aforementioned processing unit 180 (for example remote with respect to the device 10) is also configured to receive the images acquired by the linear camera 105 and to process them in order to check the different surface portions.

Preferably, the processing unit 180 is adapted for processing the second image and the third image obtained with grazing light comparing them with each other in order to obtain information on an altimetric profile of the surface portion. Preferably, the comparison between the second image and the third image to be processed comprises calculating a difference image in which each pixel is associated with a value representative of the difference between the values associated with the corresponding pixels in the second image and in the third image to be processed.

Preferably, before comparing the second image and the third image to be processed with each other it is foreseen to equalise them with each other, for example equalising the average luminosity thereof globally or locally.

Preferably, the processing unit 180 processes the first image to be processed in diffused light to detect the possible presence of defects on the second surface portion, using the information obtained from the aforementioned comparison between the second and third image to be processed.

Figure 9:
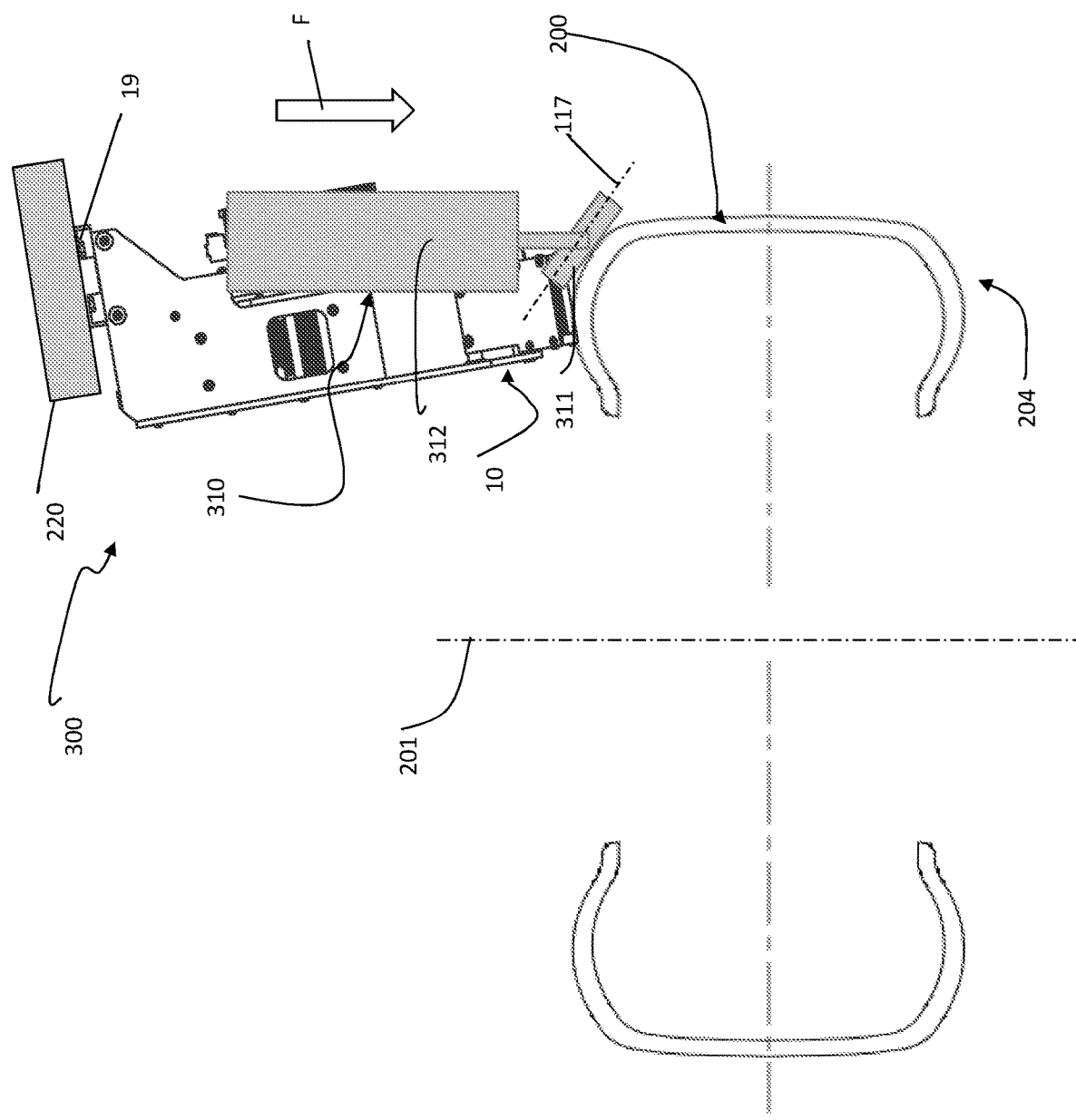
FIG. 9 shows a partial and schematic perspective view of a kit for checking tyres in accordance with the present invention.
Figure 10:
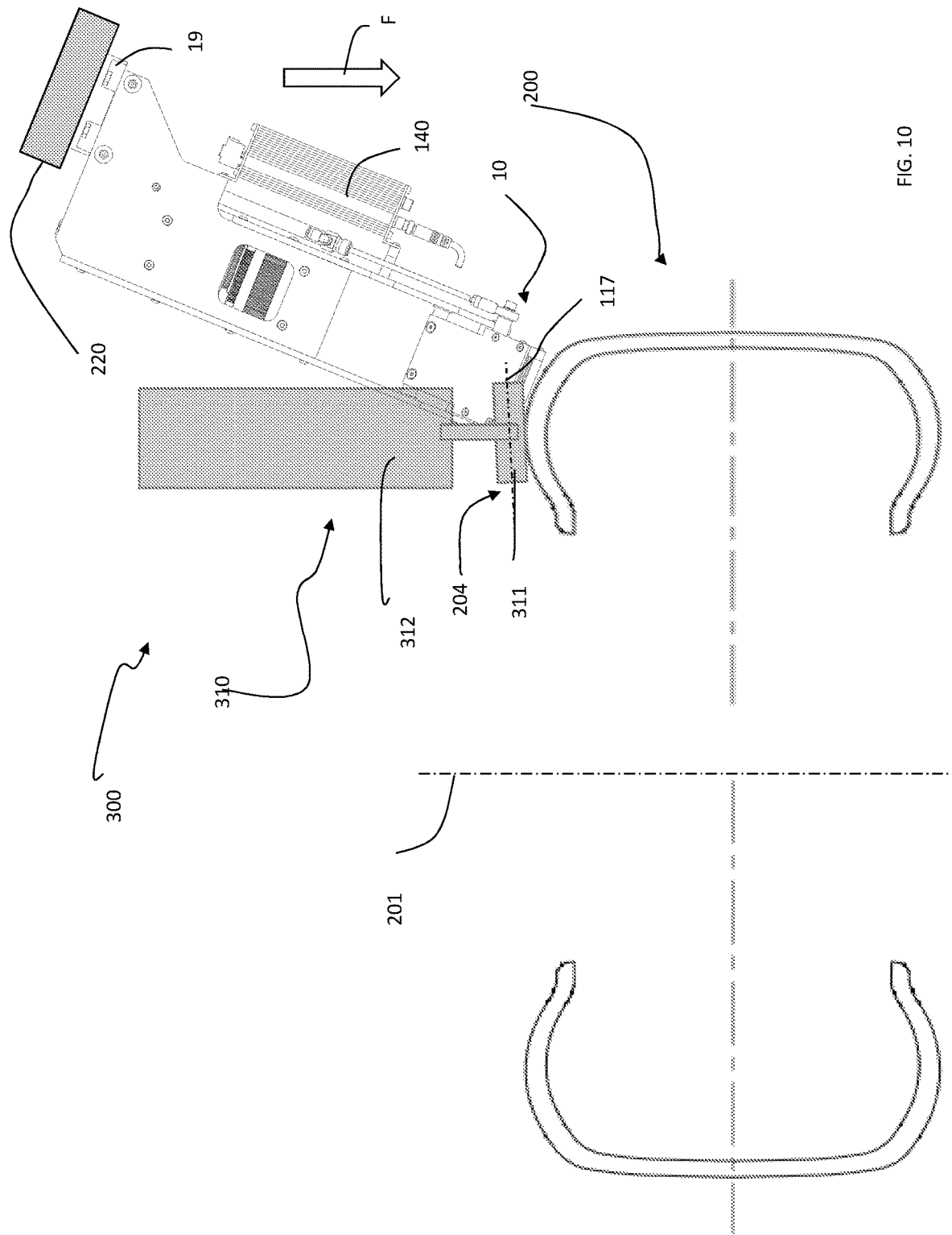
FIG. 10 shows the kit of FIG. 9 in a distinct operative step.

Preferably, as represented now in FIGS. 9 and 10, the device 10 is associated with a thrusting element 310 to form a kit 300 for checking tyres 200. The kit 300 comprises a thrusting element 310 configured to impose, through physical contact, a compression force on an outer contact surface belonging to a portion of a side wall 204 of the tyre 200 in order to elastically deform a portion of side wall. In a preferred configuration, as an example shown in FIGS. 9 and 10, the compression force F (indicated by the vertical arrow in FIGS. 9 and 10) is directed as a rotation axis 201 of the tyre 200. However, according to the Applicant the present invention encompasses the cases in which the compression force F has at least one component parallel to the rotation axis.

Preferably, the thrusting element 310 comprises a compression member 311 and an actuator member 312 adapted for moving the compression member along the direction of the compression force. As an example the actuator member 312 can be a pneumatic cylinder or alternatively an electric motor. More preferably, the compression member 311 comprises a compression roller.

Preferably, an axis 117 of the compression roller always sits on a plane passing through the axis of the tyre and in the radial direction of the portion of side wall subjected to deformation (for example the plane of FIGS. 9 and 10). Preferably, the axis 117 of the compression roller, in the absence of forces, in other words in rest position, is perpendicular to the axis of the tyre. The axis of the roller, in operation, can shift from such a perpendicular condition with the axis of the tyre (as for example shown in FIG. 9) for example in the range from 0° to 30°.

Preferably, the thrusting element 310 comprises a radial movement member (not shown, for example a further pneumatic piston and a system of guides and sliding blocks to guide the radial movement) adapted for moving the compression member and the actuator member as a unit along the radial direction of the tyre.

Preferably, the thrusting element 310 is adapted for elastically deforming a portion of a side wall 204 of the tyre 200, imposing a compression force F on an outer contact surface belonging to the portion of side wall, pressing the aforementioned compression roller on the outer contact surface. The force imposed or the movement imposed on the outer contact surface along a rotation axis of the tyre is predetermined and depends on the type of tyre to be checked. The tyres 200 can have a different elasticity and deformability according to the type and model, and therefore the force applied or the deformation imposed by the thrusting element 310 is preferably dependent on the type of tyre 200 to be checked.

Preferably, when operating with the thrusting element 310, the device 10 is in the inactive configuration of FIG. 1b, so as to be able to get close to the thrusting element 310 to illuminate and acquire images of a first surface portion of tyre 200 deformed by the thrusting element 310. Preferably, the distance between thrusting element 310, and in particular compression roller 111 and device 10 is comprised between about 20 mm and about 60 mm.

Preferably, the entire remaining portion of the side wall of the tyre 200 remains undeformed. As an example, the compression force is such as to deform the portion of side wall so that the maximum excursion, taken between all of the points of said portion of side wall, between the position in absence of forces and the deformed position, the excursion being taken along the direction of the compression force, is equal to about 20 mm.

The device 10 or the kit 300 is generally used inside an apparatus for checking tyres in a tyre production line according to the present invention, globally indicated with 1 and depicted in FIG. 8.

The apparatus 1 comprises a support 102 adapted for supporting the tyre 200 on a sidewall and for rotating the same about its own rotation axis 201, typically arranged according to the vertical Z. The support 102 is typically actuated by a movement member not described and illustrated any further, since it can as an example be of the known type.

Typically, the apparatus comprises a robotized arm 220 on which the device 10 is mounted, and in particular the device 10 comprises an attachment member 19 (see FIGS. 1a, 1b) for coupling with the robotized arm 220.

The processing unit 180 connected to the device 10 is typically configured to also control the moving member of the support 102. In this way, there is a succession of linear surface portions at the lens line of the linear camera 105, which can remain fixed.

Preferably, the apparatus comprises an encoder (not shown) for detecting the angular position of the support, the drive and control unit 140 being configured to activate said first light source 110, second light source 108, and preferably third light source 109 and control the detection system as a function of a signal of angular position of the support sent by the encoder.

The device 10, the kit 300 and the apparatus 1 have the following operation.

Figure 11:
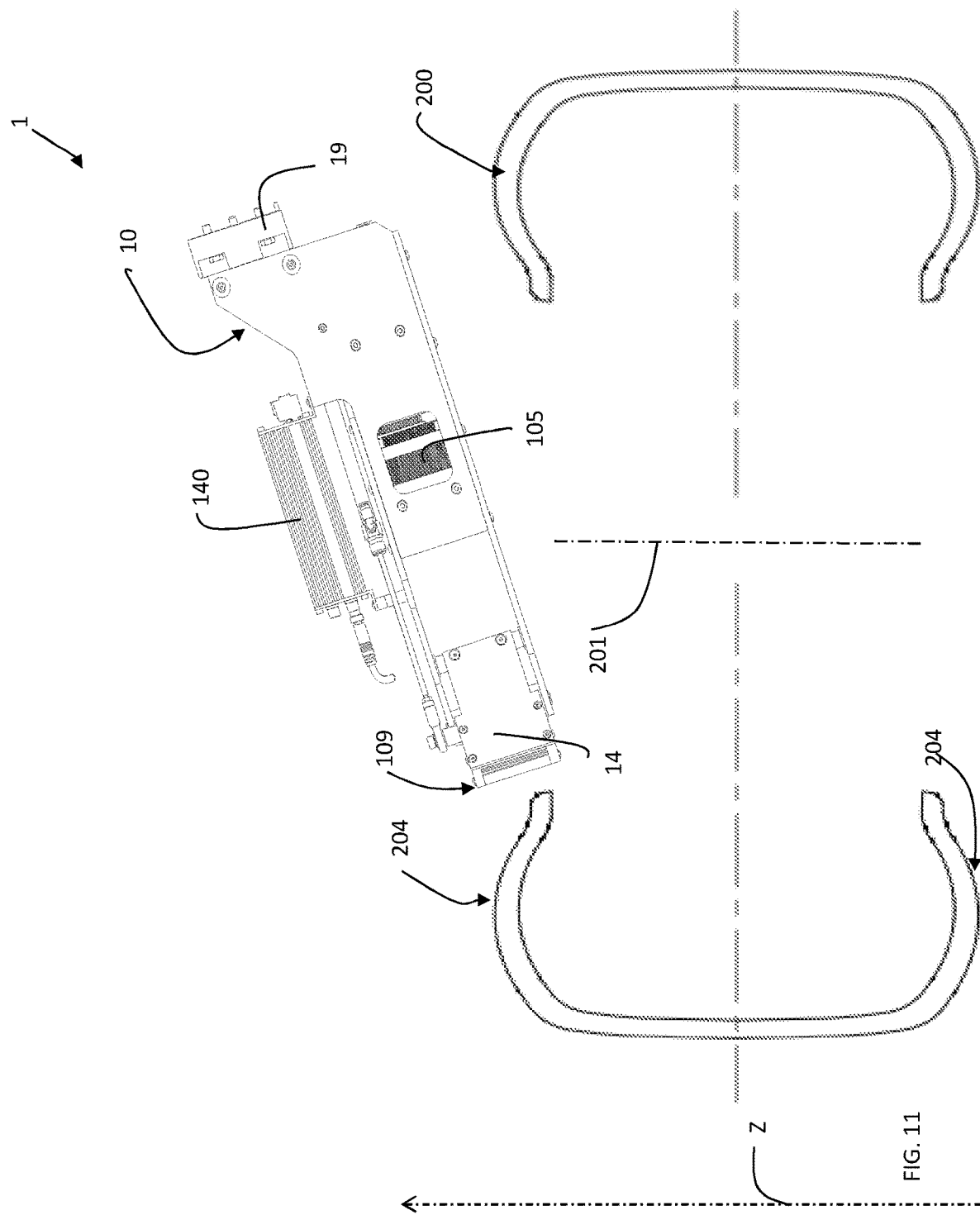
Figure 12:
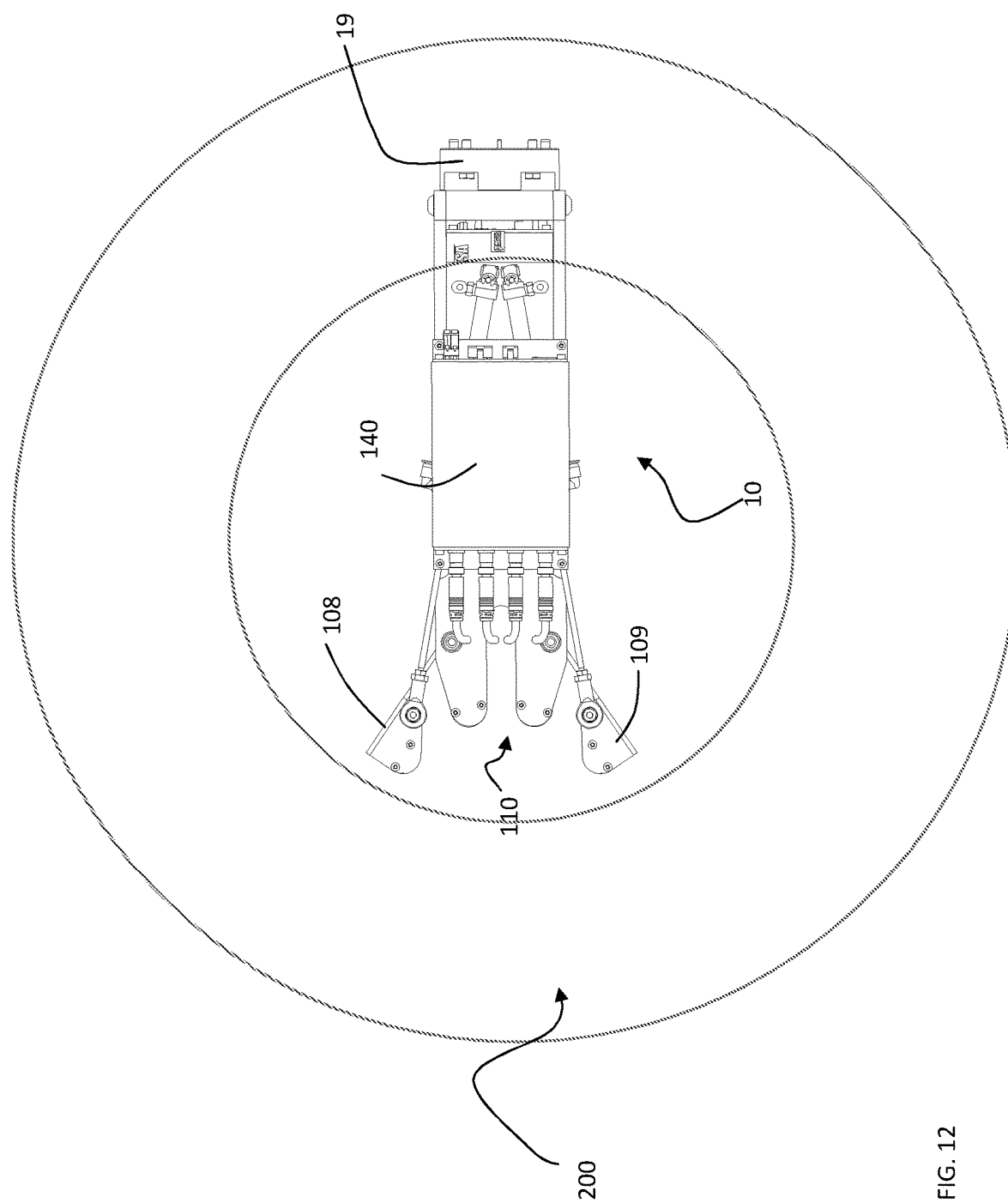
FIG. 12 shows a view from above of the apparatus of FIG. 11.

The tyre 200 is rested on the support 102. A first portion of the outer surface of the tyre 200 that is wished to be checked is then selected. According to the position of the selected surface portion of the tyre 200, the device 10 is actuated together with the thrusting element 310 (FIGS. 9 and 10) or autonomously from it (FIGS. 11 and 12). In the case in which the radially outer surface portion belongs to the sidewall or to the shoulder of the tyre 200, preferably the device 10 is positioned in the inactive configuration and is brought towards the tyre 200 together with the thrusting element 310 (FIGS. 9 and 10). Alternatively, in the case in which the selected surface belongs to the bead of the tyre 200, the device is positioned in the active configuration and is brought towards the tyre 200 without the thrusting element 310 (FIGS. 11 and 12) The thrusting element 310, as described in reference to the kit 300, deforms an outer surface portion of the tyre 200.

In the case of operation together with the thrusting element 310, the processing unit 180 controls the robotized arm 220 to move the first light source 110 towards the surface of the tyre 200 and the thrusting element 310, so that a linear surface portion at least partially coincides with, or is close to the lens line in the focal plane 121. The linear portion also belongs, at least partially, to the surface portion deformed by the thrusting element 310.

Then, the processing unit 180 controls the movement member of the support 102 to set the tyre 200 in rotation.

As a function of the angular position signal received by the encoder, with the rotation of the tyre in progress, the drive and control unit 140 cyclically activates in rapid sequence the first light source 110 and activates the linear camera 105 to acquire a respective two-dimensional digital image (in colour or monochromatic) of the respective linear surface portion in synchrony with the activation of the first light source. The drive and control unit 140, will in parallel control the switching on of the sub-sources 113 that will work in synchrony with each other and in tune with the linear camera 105. As an example each single digital image of linear portion comprises 1024 pixels.

Once the desired rotation of the tyre 200 has been carried out to examine the desired surface portion, preferably at least one complete rotation to acquire the entire circular extension, a digital image of a tyre "ring" is obtained, made with all of the digital images of the sequence of linear portions each illuminated with the first light source.

The thrusting element 310 can thus be positioned at a distinct surface portion of the tyre 200, so that a new analysis is carried out, approaching the device 10 again in the new position so as to obtain an illumination of a different outer surface portion of the tyre. See for example the difference between the position of the thrusting element 310 in FIG. 9 and in FIG. 10 and the consequent different position of the device 10 in the two figures: in FIG. 9 an outer surface portion of sidewall of the tyre 200 is illuminated by the first light source 110, whereas in FIG. 10 an outer surface portion of the shoulder of the tyre 200 is illuminated by the first light source 110.

In the case of operation without the thrusting device 310, as represented in FIGS. 11 and 12 in which a bead portion is checked, the operation of the apparatus 1 is as follows. A second outer surface portion of the tyre to be illuminated is selected, such as a surface forming part of the bead. Preferably, the device 10 is positioned in the active configuration and is brought towards the tyre 200, controlled by the processing unit 180 that controls the robotized arm 220. The device 10 therefore is brought towards the second surface portion to be illuminated, so that a linear surface portion at least partially coincides with, or is close to the lens line in the focal plane 121 (see FIGS. 11 and 12).

Then, the processing unit 180 controls the movement member of the support 102 to set the tyre 200 in rotation.

As a function of the angular position signal received by the encoder, with the rotation of the tyre in progress, the drive and control unit cyclically activates in rapid alternate sequence said first light source 110, second light source 108 and third light source 109 and activates the linear camera 105 to acquire a respective two-dimensional digital image (in colour or monochromatic) of the respective linear surface portion in synchrony with the activation of the first light source 110, of the second light source 108 and of the third light source 109 respectively.

As an example, the time between the acquisition of the first linear image and of the second linear image, as well as between the second linear image and the third linear image and then cyclically between the first linear image and the third linear image, is less than about 0.1 ms.

Once the desired rotation of the tyre 200 has been carried out to examine the desired surface portion, preferably at least one complete rotation to acquire the entire circular extension, a single digital image is obtained, made with all of the digital images of the sequence of linear portions each illuminated with a respective light source. The processing unit 180 receives such an image from the detection system 104 and extracts the corresponding first image, second image and third image of the entire desired surface portion therefrom.

Such images can be substantially juxtaposed pixel by pixel, although the real linear surface portion associated with a single linear image does not exactly coincide for the three images, due to the rotation of the tyre that has occurred in the meantime. However, the choice of the acquisition frequency of the images and of the rotation speed is such that the three images are interlaced and thus comparable pixel by pixel. Advantageously each pixel of the first (or second or third) image shows a surface micro-portion that differs from the surface micro-portion shown by the pixel of the second (or respectively third or first) image corresponding to said each pixel apart from the linear surface dimension associated with a pixel, as an example the spatial divergence being equal to about one third of a pixel. In this way, the three images are interlaced with each other and the acquisition of the three linear images takes place in a time period during which the tyre has rotated by a portion equal to one pixel (as an example equal to about 0.1 mm).

In this way, it is possible to acquire both an image in diffused light and two images in grazing light.

Preferably, the processing unit 180 is configured to calculate the difference between the second image and the third image in order to obtain information on an altimetric profile (e.g. possible presence or absence of projections and/or depressions) of the linear surface portion.

Preferably, calculating the difference between the second and third image comprises calculating a difference image in which each pixel is associated with a value representative of the difference between the values associated with the corresponding pixels in the second and third image. In this way, it is possible to use the image obtained by the difference between the second and third image to highlight the three-dimensional elements on the outer surface of the tyre (e.g. the raised writing) and to take into account such information in the processing of the image in diffused light to look for defects.

The invention claimed is:

1. A device for checking a tyre, the device comprising:
a detection system comprising a camera having an optical plane passing through the camera and defining a focal plane;
a first light source, a second light source and a third light source, wherein each of the first, the second, and the third light sources emit a first light radiation, a second light radiation and a third light radiation, respectively, to illuminate a surface portion of said tyre at or close to said focal plane, and wherein said second light source and said third light source are arranged at opposite sides with respect to said optical plane;
further wherein said first light source is fixed with respect to said detection system and said second light source and third light source are movable;
said second light source and said third light source are movable from a first inactive configuration located at a distance where said second light source and said third light source from said focal plane is greater than the distance of said first light source from said focal plane, to an active configuration where the distance of said second source and of said third source from said focal plane is equal to or less than the distance of said first source from said focal plane; and
a drive and control unit for activating said detection system to acquire a first image and at least a second image of a first surface portion and a second surface portion of said tyre in said inactive configuration and in said active configuration, respectively;
wherein said drive and control unit, in said inactive configuration:
switches said first light source on and off at a certain frequency; and
activates said detection system acquiring said first image in synchrony with the switching on of the first light source.

2. The device according to claim 1, wherein said camera is a linear camera.

3. The device according to claim 1 or 2, wherein said camera is a colour camera.

4. The device according to claim 1, wherein at least one from said first image and said second image is a two-dimensional image.

5. The device according to claim 1, wherein in said active configuration of said second light source and third light source are arranged symmetrically with respect to said first light source.

6. The device according to claim 1, wherein said first light source comprises a first sub-source and a second sub-source, and said first sub-source and said second sub-source are arranged at opposite sides of said optical plane.

7. The device according to claim 1, wherein said first light source illuminates said first surface portion or said second surface portion with diffused light radiation.

8. The device according to claim 1, wherein said second light source and third light source illuminate said second surface portion with grazing light radiation.

9. The device according to claim 1, wherein said first light source, said second light source, or said third light source define a main direction of extension.

10. The device according to claim 9, wherein said main direction of extension is substantially parallel to the optical plane.

11. The device according to claim 1, wherein said first light source, or said second light source, or said third light source comprises one or more light emitting diodes (LEDs).

12. The device according to claim 1, wherein said drive and control unit, in said active configuration:
switches at least one among said first light source, said second light source and said third light source on and off, alternately; and
activates said detection system so as to acquire said at least one second image in synchrony with the aforementioned switching on action.

13. The device according to claim 12, wherein in said active configuration, said drive and control unit controls said detection system to acquire three distinct images, each image corresponds to switching on of a different light source from said first light source, said second light source and said third light source.

14. The device according to claim 1, further comprising a first support, a second support and a third support, wherein said second support and third support are hinged to said first support, and said second light source and said third light source are fixed to said second support and third support, respectively.

15. The device according to claim 1, wherein an angle formed by said focal plane and a plane joining an intersection line between the optical plane and the focal plane; and a point of said second light source or of said third light source form an angle greater than or equal to about 55°.

16. The device according to claim 1, wherein said first light source, said second light source, or said third light source comprises a converging lens adapted for narrowing an emission field angle of said first light radiation, of said second light radiation, or of said third light radiation to a value ranging from between about 10° and about 50°.

17. The device according to claim 1, wherein, in said active configuration, said second light source and third light source are coplanar and define a plane substantially parallel to the focal plane.

18. The device according to claim 17, wherein, in said active configuration, a distance between a plane parallel to said focal plane and passing through said first light source and a plane parallel to said focal plane and passing through said second light source and said third light source is comprised between about 0 mm and about 50 mm.

19. A kit for checking a tyre, the kit comprising:
a device comprising:
a detection system comprising a camera having an optical plane passing through the camera and defining a focal plane;
a first light source, a second light source and a third light source, wherein each of the first, the second, and the third light sources emit a first light radiation, a second light radiation and a third light radiation, respectively, to illuminate a surface portion of said tyre at or close to said focal plane, and wherein said second light source and said third light source are arranged at opposite sides with respect to said optical plane;
further wherein said first light source is fixed with respect to said detection system and said second light source and third light source are movable from a first inactive configuration located at a distance where said second light source and said third light source from said focal plane is greater than the distance of said first light source from said focal plane, to an active configuration where the distance of said second source and of said third source from said focal plane is equal to or less than the distance of said first source from said focal plane; and
a drive and control unit for activating said detection system to acquire a first image and at least a second image of a first surface portion and a second surface portion of said tyre in said inactive configuration and in said active configuration, respectively; and
a thrusting element, wherein the thrusting element applies a force to a surface to be checked of said tyre when said second light source and third light source of said device are in said inactive configuration;
wherein said surface to be checked is at least in part said first surface portion.

20. The kit according to claim 19, wherein said thrusting element applies a deformation to said tyre dependent on a selected type of tyre to be checked.

21. The kit according to claim 19, wherein the distance between said first light source and said thrusting element ranges from between about 20 mm and about 60 mm.

22. The kit according to claim 21, wherein said thrusting element applies a substantially constant force on said surface to be checked.

23. The kit according to claim 22, wherein said thrusting element applies a substantially constant deformation on said surface to be checked.

* * * * *